United States Patent
Harris et al.

(10) Patent No.: US 10,706,607 B1
(45) Date of Patent: Jul. 7, 2020

(54) GRAPHICS TEXTURE MAPPING

(71) Applicant: Arm Limited, Cambridge (GB)

(72) Inventors: Peter William Harris, Cambridge (GB); Edvard Fielding, Trondheim (NO); Andreas Due Engh-Halstvedt, Trondheim (NO); Lukasz Kulasza, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/280,924

(22) Filed: Feb. 20, 2019

(51) Int. Cl.
*G06T 15/04* (2011.01)
*G06T 5/20* (2006.01)

(52) U.S. Cl.
CPC .............. *G06T 15/04* (2013.01); *G06T 5/20* (2013.01)

(58) Field of Classification Search
None
See application file for complete search history.

(56) References Cited

U.S. PATENT DOCUMENTS

2016/0110889 A1\* 4/2016 Shim ............... G06T 11/001
345/582

\* cited by examiner

*Primary Examiner* — Yingchun He
(74) *Attorney, Agent, or Firm* — Vierra Magen Marcus LLP

(57) ABSTRACT

When a graphics texture mapping apparatus is to perform a texture filtering operation that uses the data values of a plurality of texels, the texture mapper first determines whether any of the data values of the texels to be used for the texture filtering operation are the same, and then selects a texture filtering operation to be performed using data values of the texels based on the determination. The texture mapper then performs the selected texture filtering operation using one or more of the data values of the texels to provide the required texture filtering operation output result.

20 Claims, 18 Drawing Sheets

GRAPHICS TEXTURE MAPPING

BACKGROUND

The technology described herein relates to a method of and an apparatus for performing texture mapping in graphics processing systems.

It is common in graphics processing systems to generate colours for sampling positions in a render output (e.g. image to be displayed) by applying so-called textures or texture data to the surfaces to be drawn. Such textures are typically applied by storing an array of texture data elements ("texels"), each representing given texture data (such as colour, luminance, and/or light/shadow, etc. values), and then mapping the texels onto the corresponding samples, such as (and, indeed, typically) a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. using a bilinear filtering process).

FIG. 1 shows an exemplary graphics processor (graphics processing unit (GPU)) 100 that can perform texture mapping.

As shown in FIG. 1, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

FIG. 2 shows an exemplary texture mapper (texture mapping apparatus) 110 in more detail.

As shown in FIG. 2, the texture mapper 110 includes a number of processing stages (circuits), including an input request stage (circuit) 200 that accepts texture mapping operation requests from a renderer (e.g. the fragment shader 104 in FIG. 1). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then, if necessary, a level of detail (LOD) computation stage (circuit) 202, that can determine the level of detail at which the texture is to be sampled for the texture mapping operation (e.g. that selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 2, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 2, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear or trilinear, or any other form of filtering, to generate the desired filtered sample result.

The Applicants believe that there is scope for improvements to the performance of texture mapping in graphics processing systems.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
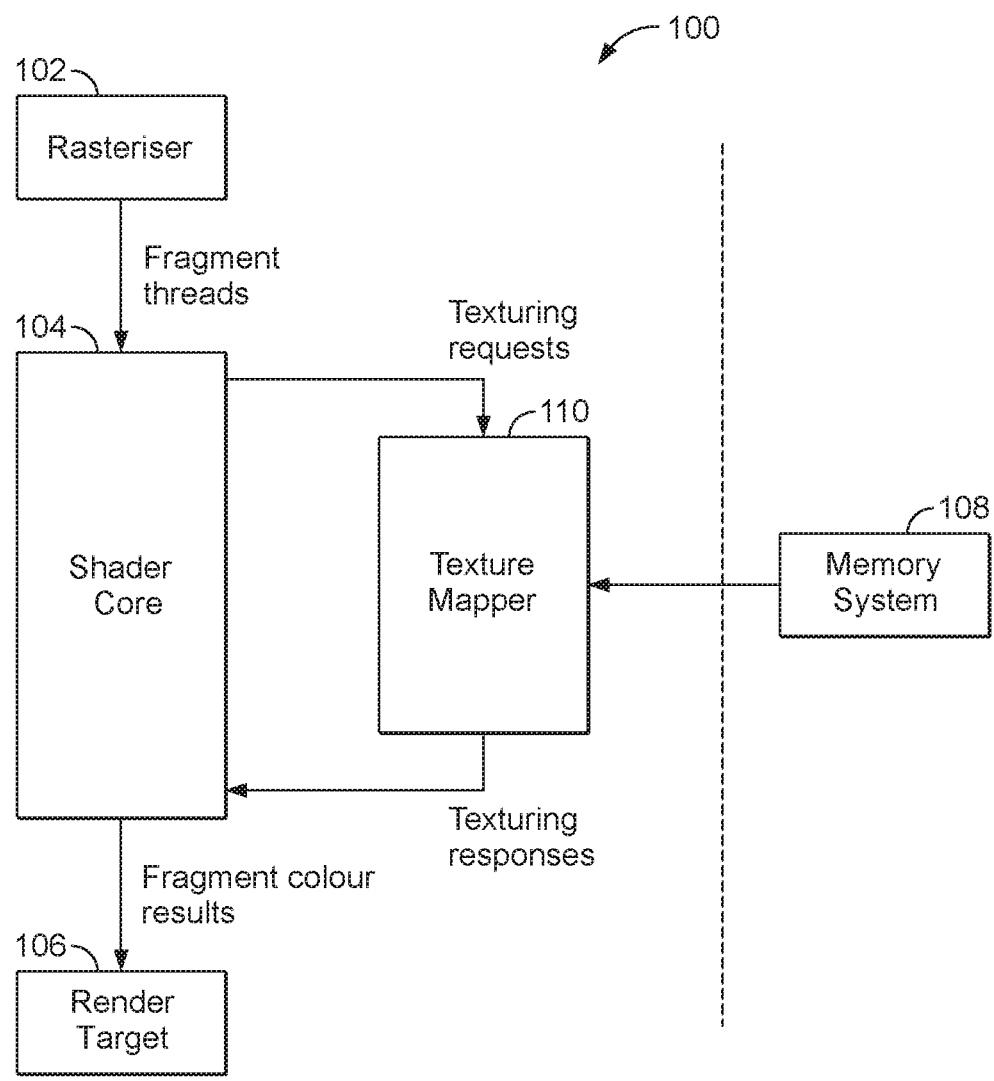
FIG. 1 shows schematically a graphics processor that includes a texture mapper.

A first embodiment of the technology described herein comprises a method of operating a graphics texture mapping apparatus, in which the texture mapping apparatus is operable to fetch data values for a plurality of texture data elements to be used in a texture filtering operation, and to perform a texture filtering operation using the fetched texture data element values to provide a texture filtering operation output result;

the method comprising:
when performing a texture filtering operation that uses the data values of a plurality of texture data elements to provide a texture filtering operation output result:
determining whether any of the data values of the texture data elements to be used for the texture filtering operation are the same;
selecting a texture filtering operation to be performed using data values of the texture data elements based on the determination; and
performing the selected texture filtering operation using one or more of the data values of the texture data elements to provide the texture filtering operation output result.

A second embodiment of the technology described herein comprises a graphics texture mapping apparatus, comprising:
a texture data fetching circuit operable to fetch data values for a plurality of texture data elements to be used in a texture filtering operation;
a texture filtering circuit operable to perform a texture filtering operation using texture data element values fetched by the texture data fetching circuit to provide a texture filtering operation output result;
the texture mapping apparatus further comprising a texture filtering operation selection circuit configured to, when the texture mapping apparatus is to perform a texture filtering operation that uses the data values of a plurality of texture data elements to provide a texture filtering operation output result:
determine whether any of the data values of the texture data elements to be used for the texture filtering operation are the same;
select a texture filtering operation to be performed using data values of the texture data elements based on the determination; and
cause the texture filtering circuit to perform the selected texture filtering operation using one or more of the data values of the texture data elements to provide the texture filtering operation output result.

The technology described herein relates to computer graphics texture mapping. In the technology described herein, when a texture filtering operation that uses data values for plural texture data elements (texels) is to be performed, it is first determined whether any of the texels have the same data value, with the texture filtering operation that is performed then being selected based on whether any of the texels have the same data value or not.

The Applicants have recognised in this regard that when performing texture filtering operations, it can be the case that two or more (e.g. all) of the texels that are to be used for an, e.g. bilinear filtering operation, may in practice have the same data value. This can arise, for example, where the texels are being taken from a constant colour region within a texture. In such a case, e.g. where all four texels to be used in a bilinear filtering operation have the same colour value, then the result of that bilinear filtering operation will simply be the (same) colour value that each of the texels have. In that case, that output result can be generated, e.g., by performing a more simple texture filtering operation, such as simply taking the value of the "nearest" texel to the texture position that is being sampled, rather than performing a "full" bilinear filtering operation.

This may then allow the required texture filtering output result to be generated in a more efficient and less processing intensive manner, thereby, for example, reducing the computation requirements when performing the texture mapping operation. In particular, the number of component computations to implement the requested texture filtering operations can be reduced, thereby reducing energy consumption when performing texture mapping.

As will be discussed further below, the technology described herein exploits this by determining whether the texels to be used for a texture filtering operation have the same data values, and to, if so, then select a texture filtering operation accordingly, such as, and in an embodiment, a texture filtering operation that will use a fewer number of filtering calculations to provide the desired texture filtering output result.

Furthermore, the Applicants have recognised that situations in which a texture filtering operation will be sampling from constant, e.g. colour, regions may be relatively common in certain circumstances, but may not in themselves be identifiable in advance of performing the texture mapping operation itself. For example, user interface displays may contain relatively large regions of constant colour, but when scrolling or zooming a user interface display, the actual regions of constant colour within any given frame being displayed may not be able to be determined in advance of actually generating the frame for display, such that the constant colour regions may only be identifiable at runtime, when performing the texture mapping operation itself. Thus the operation in the manner of the technology described herein where the texture mapping operation is configured to identify texels having the same data values and to operate accordingly can provide potentially significant reductions in the computation requirements and accordingly in energy consumption, when rendering frames (images) for display.

The textures that are used in the technology described herein will comprise appropriate (e.g. 2D) arrays of texture data elements (texels), each having an associated data (e.g. colour) value.

The textures that are to be used by the texture mapper will be, and are in an embodiment, stored in a (main) memory (memory system) of the overall data/graphics processing system that the texture mapper (and, e.g., graphics processor) is part of. This memory system may comprise any suitable and desired memory and memory system of the overall data/graphics processing system, such as a main memory for the graphics processing system (e.g. where there is a separate memory system for the graphics processor), or a main memory of the data processing system which is shared with other elements, such as a host processor (CPU), of the data processing system. Other arrangements would, of course, be possible.

The texture mapper (texture mapping apparatus) (and texture mapping process) of the technology described herein includes a texture data (texel) fetching circuit (circuitry) (stage) that is operable to (configured to) fetch texture data values (texels) to be used when performing a texture filtering operation, and a texture filtering circuit (circuitry) (stage) that is operable to (configured to) perform a texture filtering operation using texture data values (texels) fetched by the texture data fetching circuit.

The texture data fetching circuit and the texture filtering circuit may comprise any desired and suitable processing circuits (circuitry) operable to perform the required functions. These circuits may be in the form of one or more dedicated hardware elements that are configured appropriately, and/or they may comprise programmable processing circuitry that has been programmed appropriately.

The texture data fetching circuit (stage) could be operable to fetch the texture data (texels) for use in a texture filtering operation directly from the (main) memory system where the texture(s) is stored, but in an embodiment is operable to (and configured to) fetch the texels (their values) from local storage, such as, and in an embodiment, a (texel) cache or caches, of the texture mapper. This local storage is in an embodiment in the form of a (texture) cache system, that includes one (or more) caches operable to store texture data (texels) locally to the texture mapper.

Thus, in an embodiment, the texture mapper (texture mapping apparatus) of the technology described herein further comprises a cache system that is operable and configured to store texture data values (texels) locally to the texture mapper, and from which the texture data fetching circuit will fetch texels and texel values for use in texture filtering operations.

This cache system in an embodiment interfaces with and accesses the (main) memory system of the overall graphics/data processing system that the texture mapper is part of, so that texels (texture data) can be fetched from the memory system and then loaded into a cache or caches of the texture mapper cache system for use when performing texture filtering operations.

The cache system of the texture mapper may interface with and receive data from the (main) memory (and memory system) in any suitable and desired manner. In an embodiment, texture data is fetched by the texture mapper cache system from a cache of the (main) memory system, such as, and in an embodiment, from an L2 cache of the main cache hierarchy of the graphics processor's memory system.

Thus, in an embodiment, the texture data fetching circuit (and operation) is operable to and configured to read texels (texture data) that are required for a texture filtering operation from local storage, e.g., and in an embodiment, a cache or caches of a cache system, of the texture mapper. The texture data fetching circuit/process may therefore comprise a cache lookup (read) circuit (stage) that is operable to fetch the data for required texels from a (texel) cache (local storage) of the texture mapper.

In this case, when the cache lookup finds that the required texture data is present in a cache, then that data can simply be read from the cache and provided to the texture filtering circuit for use in the texture filtering operation (without sending any request for that data out to the main memory system).

On the other hand, when the cache lookup finds that any of the required texels (texture data) are not already present in the cache (there is a cache miss), then the texture mapper cache system is in an embodiment triggered to fetch the required texels (texture data) into the cache from memory. The texture filtering operation is in an embodiment stalled (e.g. parked in a record of waiting texture filtering operations) until the required texels (texture data) have been fetched into the cache.

Thus, in an embodiment, the texture mapper cache system comprises a texture data (texel) loading circuit (circuitry) (stage) operable to load texels (texture data values) from the (main) memory system where that texture data is stored into a cache or caches of the texture mapper cache system. In an embodiment, this texture data loading circuit (stage) is operable to convert texture coordinates (sampling positions) that may be associated with texture mapping and texture filtering operations to corresponding memory addresses where the corresponding texels (texture data) for those coordinates and sampling positions are stored.

In an embodiment, the texture mapper cache system also includes a texture data decoding (decompressing) circuit (circuitry) (stage) (in an embodiment following the texel (texture data) loading circuit) that is operable to perform any decoding, such as decompression, of texture data that is stored in memory in an encoded (e.g. compressed) form, before that data is loaded into the cache or caches of the texture mapper.

The texture mapper cache system should, and in an embodiment does, contain at least one texel cache operable and configured to store texels (data values of texture data elements) for use by the texture mapper. In embodiments, the cache system of the texture mapper includes more than one texel cache, such as, and in an embodiment, two texel caches, each configured to store texels and texture data in a different manner.

The texture data is in an embodiment stored in the cache or caches of the texture mapper cache system in an uncompressed form (e.g., in particular where the texture data is stored in the memory in a compressed form).

A (and each) cache of the texture mapper cache system may be configured to store texels and texture data in any suitable and desired manner. Subject to the particular features for the cache or caches of the texture mapper cache system discussed herein, these caches can otherwise be configured and operate in any suitable and desired manner, such as, and in an embodiment, in dependence on and according to the normal cache mechanisms for the graphics/ data processing system in question. Thus they may, for example, and in an embodiment do, use normal cache operations and processes, such as least recently used (LRU) processes, to identify and free-up cache lines for use, etc., and to control the storing of texels (texture data) in the cache(s).

Each cache of the texture mapper in an embodiment comprises a plurality of cache lines, each operable to store texture data, and having an associated identifier (a "tag") that can be used to identify the texture data (texels) stored in the cache line (i.e. that can be used as a "lookup" key to read texture data from the cache).

In an embodiment, the texture data stored in a (and in an embodiment in each) cache in the cache system that the texture data fetching circuit reads data from is identified (tagged) using an identifier that is indicative of a position in the graphics texture that the cached texture data (texels) comes from (relates to). In an embodiment each cache line of texture data is identified (is tagged) using a position in the texture that the texture data (texels) that is stored in the cache line comes from (relates to).

Thus, in an embodiment, the texture data is stored in the cache or caches of the texture mapper cache system that the texture data fetching circuit fetches the data values from so as to be identified by means of an identifier that is indicative of a position in the texture in question. The effect of this then is that the texture data in the cache(s) can be accessed (and requested from) the cache by the texture data fetching circuit directly based on the texture position (texel positions) that is required. This will then allow the cache(s) to be addressed by the texture data fetching circuit by using texture positions (coordinates), i.e. the positions of the texels whose data is required (as opposed, for example, to using memory addresses to address (lookup in) the texture cache(s)).

The position in a texture that a cache line is tagged with could, e.g., comprise the actual position of a texel whose data is stored in the cache line (e.g. of the first texel that is stored in the cache line), but need not be the position of a particular texel, but could, for example, be otherwise indicative of a region within the texture that the data in the cache line relates to. A single position identifier (tag) could be used for a given cache line, or the cache line could be associated with (tagged with) a range of positions (indicating a range of texture positions that the data in the cache line relates to).

For example, the overall texture could be considered to be divided into respective regions (e.g. having the same size and shape (configuration), e.g. with each region corresponding to a given block of texels that will fill a cache line), with the position identifier (tag) used for a given cache line then indicating a suitable index position (coordinate) for the texture region within the texture that the data in the cache line corresponds to.

Each cache line identifier (tag) may include other information as well, such as the identification of the texture that the texels in the cache line come from (and any particular surface (e.g. mipmap) for that texture). The tag may also be used to convey other information, such as the format of the texels in the cache line and include a "valid" bit (flag) that can be set to indicate that the cache line contains valid data. Other arrangements would, of course, be possible.

In an embodiment the cache system of the texture mapper includes a cache configured such that each cache line in the cache can store (and stores) a plurality of individual (discrete and separate) texture data values (stores a plurality of texels), as respective individual (discrete) entries (data units) in the cache line (thus, a cache line will have the capacity to store a plurality of discrete data units, each corresponding to a given texel (and storing a given texel's data value)). For example, each cache line may be able to store up to sixteen texels. In the case where the cache system of the texture mapper includes only a single cache, then that single cache is in an embodiment configured and operates in this manner.

The texture data is in an embodiment stored in this cache as respective "texels" (texture data elements) (irrespective of the form in which the data may be stored in the main memory system). Thus, each cache line will be able to store a plurality of texels (the data values for a plurality of texels). In an embodiment, each cache line stores (and the texels are loaded into the cache such that each cache line of the cache stores) a set of contiguous texels of a texture (i.e. represents a set of adjacent (or successive) texture data element positions of the texture in question). Correspondingly, each cache line in an embodiment stores texels from a particular, single texture only.

Thus, the texels stored in a cache line of this cache in an embodiment comprise a set of texels that cover a particular region (area) of the texture in question, such as a row or column of texels or a block (e.g. a square or rectangle) of contiguous texels.

In an embodiment, the cache system of the texture mapper includes a cache that is configured to, rather than store plural individual texels (the data values for individual texels) in each cache line, instead store in each cache line an indication of a (single) data value (e.g. colour) that the cache line is associated with, together with an indication of a region of a texture to which that data value applies. Thus, each cache line in this cache will, and in an embodiment does, store (and have the capacity to store) a single data entry (unit), indicative of a single texture data value, together an indication of a region of a texture to which that data value applies (in an embodiment as a tag to the cache line). This cache will then, in effect, indicate and store data for, constant data value (e.g. constant colour value) regions within textures.

This constant texel region cache in an embodiment has a plurality of cache lines, with each cache line storing an indication of a data value (e.g. colour) for that cache line, together with an identifier (tag) indicating a region within the texture to which that cache line (and accordingly its data value) applies.

Where such a constant texel region cache is used, that cache is in an embodiment in addition to a cache of the type discussed above that can store plural individual texel values in each cache line. Thus, in this case, the texture mapper cache system will comprise two caches.

The data value for a cache line in the constant texel region cache could be indicated by storing the actual data value in the cache line (as the cache line data), or the cache line could store (as its cache line data) an index into a, e.g. data value table, with the data value table then storing the actual data value (e.g. colour value) to be used for the cache line in question. The use of indices into a constant data value table may be preferred, as comparing indices may be more straightforward to perform than comparing actual data values.

Where a constant data value table is used, that table is in an embodiment also cached by the texture mapper, in its cache system, in an embodiment in association with the constant texel region cache.

The region within a texture that a cache line in the constant texel region cache relates to can be indicated in any suitable and desired manner. In an embodiment this indication is provided by associating (tagging) the cache line with a position in the texture. In this case, each cache line could be tagged (have associated with it) a single position from which the region in the texture that the cache line relates to can be determined, or it could, for example, indicate a range of positions (coordinates) that the region covers.

Such a constant texel value region cache can be populated with texture data in any suitable and desired manner. For example, the system could operate such that when a set of plural texels for loading into the texture mapper cache system is fetched from (main) memory, if all of those texels have the same data value, then they are allocated a line (if available) in the constant texel value region cache for that set of texels.

Additionally or alternatively, the process could operate to compare new texels with existing constant texel value regions in the constant texel value region cache, and be operable to, potentially, add newly fetched texels to an existing constant texel value cache region (line), where it is appropriate to do that. For example, when a texel or texels is fetched from the memory, it could be determined whether the texel(s) has a contiguous position with and the same data value as any of the constant texel value regions for which data is stored in the constant texel value region cache, and, if so, e.g., the texel(s) added to the appropriate cache line in the constant data value region cache (e.g., and in an embodiment, by updating the indication of the region that that cache line corresponds to to include the new texel(s)).

The process could also be operable to merge constant texel value regions (cache lines) stored in a constant texel value region cache where it is appropriate to do that.

The texture filtering circuit and operation of the texture mapper can perform a texture filtering operation using texels (texture data values) fetched by the texture data fetching circuit (stage) in any suitable and desired manner.

In an embodiment, the texture filtering circuit is in an embodiment operable to perform, and can perform, a number of different filtering operations, such as bilinear, trilinear and anisotropic filtering. In an embodiment, the texture filtering circuit is able to perform two bilinear filtering operations in parallel (at the same time).

The texture filtering circuit (stage) is in an embodiment also operable to (configured to) calculate (e.g. internally) a set of interpolation weight values to be used for a texture filtering operation (and to then perform the texture filtering operation using the set of calculated interpolation weight values and a set of fetched texels (texture data values)).

The texture filtering circuit can perform a texture filtering operation in any desired and suitable way, for example, and in an embodiment, as one or more texture filtering passes (e.g. bilinear filtering passes) (e.g. depending upon the capability of the texture filtering circuit). For example, a bilinear filtering operation may be performed as a single bilinear filtering pass, a trilinear filtering operation may be performed as two bilinear filtering passes, etc.

As well as the texture data fetching circuit (and cache system) and the texture filtering circuit, the texture mapper (texture mapping apparatus) can otherwise include any suitable and desired circuits, units and stages for performing texture mapping operations, and perform the required texture mapping operations in any suitable and desired manner. Thus it may, for example, and in an embodiment, further comprise one or more or all of: a coordinate calculation circuit (stage); a level of detail computation circuit (stage); a texel selection circuit (stage); and an output result providing circuit (stage).

The technology described herein relates to the situation where the texture mapper is to perform a texture filtering operation using the data values of a plurality of texture data elements (texels). Such a texture filtering operation may be triggered in any suitable and desired manner. For example, and in an embodiment, the texture mapper may receive a request for a texture mapping operation, e.g. from a renderer (e.g. fragment shader) of a graphics processor, which texture mapping operation request will indicate, inter alia, that a texture filtering operation is to be performed using plural texels. In response to such a request from the renderer, the texture mapper will perform the desired texture mapping operation.

The texture filtering operation that is being performed can be any desired and suitable form of texture filtering operation that uses plural texels (that filters a set of plural texels (texture data values)) to provide a "filtered" output value. For example, the texture filtering operation may comprise linear filtering (which will filter a pair of texels), bilinear filtering (which will use a set of four texels), trilinear filtering (8 texels), or higher order (e.g. anisotropic) filtering, etc.

In the technology described herein, when a texture filtering operation using plural texels is to be performed, the actual texture filtering operation that is performed is selected based on whether any of the texels have the same value or not. The determination could be to determine whether all of the texture data values are the same, whether none of the texture data values are the same, and/or whether a subset (only some but not all) of the data values are the same (or any combination thereof).

The texture mapper could be operable to perform and to select between two (and only two) different forms of texture filtering operation, or there could be more than two different types of texture filtering operation that can be selected between, as desired. This may vary depending upon the type of filtering operation that has been requested, if desired.

In an embodiment, the texture mapper is operable to perform a first texture filtering operation in the case where all of the texel values have the same value, and to perform at least one other, different, texture filtering operation in the case where only some and/or none of the texel values are the same. Thus, in an embodiment, one of the texture filtering operations that can be selected is used when all the texel values are the same. Correspondingly, there is in an embodiment a texture filtering operation that is selected (at least) when all the texel values differ.

In one embodiment there are only two different texture filtering operations that can be selected between, with one of those operations being used when all the texel values are the same, and the other texturing operation being used in the case where at least one of the texel values is different to the other texel values. In this case, one texture filtering operation will be used when all the texel values are the same, with another texture filtering operation being selected and used where not all of the texel values are the same (where some but not all of the texel values are the same, or none of the texel values are the same).

It would also be possible to provide and select a texture filtering operation that is to be used when some but not all (a subset) of the texel values are the same. For example, in the case of a bilinear filtering operation, it could be identified whether the respective horizontal or vertical pairs of texel values are the same, with the bilinear filtering operation then being simplified in that event. In this case therefore, there may be (at least) three texture filtering operations that can be selected between and used, one when none of the texel values are the same, one when all of the texel values are the same, and one (or more) when some but not all (a subset) of the texel values are the same. In an embodiment, this is the case.

The particular texture filtering operations that are performed in dependence upon whether some or all or none of the texel values are the same can be selected as desired. Each different texture filtering operation that can be selected and performed should differ from the other texture filtering operations in a given (and appropriate) manner, e.g., and in an embodiment, in dependence upon how many of the texel values are the same (and whether that accordingly permits a "simplified" filtering operation to be performed).

As discussed above, the texture mapper may, and in an embodiment does, receive a texture mapping request, e.g. from a renderer (e.g. fragment shader), e.g. a graphics processor, which texture mapping request may, and in an embodiment does, indicate, inter alia, a particular texture filtering operation to be performed. For example, the texture mapping operation request could indicate that a bilinear filtering operation is to be performed using four texel values.

In an embodiment, the texture filtering operation that is performed in the case where none (or an insufficient number) of the texel values are the same, comprises the texture filtering operation that is indicated in the texturing operation request that is received by the texture mapper.

Correspondingly, in an embodiment, the texture filtering operation that is selected and performed when the appropriate number of texel values are determined to be the same in an embodiment comprises a texture filtering operation that is different to the texture filtering operation indicated in the texture mapping operation request received by the texture mapper, such as, and in an embodiment, being a modified or simplified version of the texture filtering operation that is indicated in the texture mapping operation request, or a completely different form of texture filtering operation.

Thus, in an embodiment, the texture filtering operation that is selected and used (at least) in the case where none of the texel values are the same comprises the texture filtering operation that was indicated in the texture mapping operation request sent to the texture mapper.

In an embodiment, the texture filtering operation that is selected and used when all the texel values are the same simply selects the value of one of the texels directly (e.g. comprises a "nearest" sampling operation), i.e. such that the texture filtering operation simply selects and uses (and provides as the output result) the texel value of one of the texels to be filtered (e.g. of the nearest texel to the position within the texture that is being sampled).

In the case of a bilinear filtering operation, in one embodiment, the texture mapper either selects and performs a (normal) bilinear filtering operation to perform as the texture filtering operation in the case where not all of the texel values are the same, or simply selects the value of one texel (e.g. performs a "nearest" sampling operation) as the texture filtering operation that is performed in the case where all the texel values are determined to be the same.

In an embodiment, when bilinear filtering is being performed, the texture mapper can also modify the bilinear filtering so as to select the value of one (e.g. the nearest) texel of a pair of texels along an axis direction, in the case that it is determined that the pair of texels along that axis to be filtered have the same value.

In this case, for example, when performing the bilinear filtering operation, when it is determined that a pair of texels along the horizontal axis for the bilinear filtering operation have the same value, then rather than performing an appropriate linear interpolation of those values, the texture filtering operation will simply select the value of one of the pair of texels (e.g. of the nearest texel) along the horizontal axis as the value to use in the bilinear filtering computation (and/or correspondingly for the vertical axis). In this case, this modification of the bilinear filtering operation could be considered and performed (where appropriate) in both the horizontal and vertical directions, or it could be performed and considered for one axis direction only (e.g. for the horizontal axis only).

Corresponding arrangements may be used for other forms of texture filtering operation, such as trilinear filtering. For example, a trilinear filtering operation can be considered to be combination of a pair of bilinear filtering operations, so each bilinear filtering operation can be treated in the manner of a bilinear filtering operation, as discussed above, if desired. Similarly, if it is determined that all eight sample texels for trilinear filtering operation have the same value, then the trilinear filtering operation can be replaced with outputting the value of one of the texels (e.g. a nearest sampling operation) directly (as discussed above for a bilinear filtering operation).

Other appropriate and corresponding arrangements can be used for other forms of texture filtering operations. For example, in the case of anisotropic filtering, in which an overall filter is assembled by combining one or more component filtered lookups (which may themselves be bilinear or tri-linear filters), any constant regions could be amortized over multiple component filtered lookups, if desired.

The determination of whether any of the texture data values (texels) to be used for a texture filtering operation have the same value or not (and the subsequent selection of the texture filtering operation to use) can be performed in any suitable and desired manner.

In an embodiment, this determination is performed as part of the process of the fetching of the texture data values (the texels) for the texture filtering operation from the texel cache(s) where they are stored.

In an embodiment, this determination is performed after the texture data values (the texels) have been fetched from the cache (after the cache lookup), but before the texture filtering operation itself is performed (and in an embodiment immediately prior to the texture filtering operation).

Thus, in an embodiment, the texture filtering operation selection circuit (stage) of the texture mapper is located and acts between the texture data fetching circuit (stage) and the texture filtering circuit (stage) of the texture mapper.

In one embodiment, the determination of whether any of the texture data values are the same prior to the texture filtering operation uses (and in an embodiment compares) the actual texture data (e.g. colour) values (and/or indices indicative of those values, as discussed above) that are to be used in the texture filtering operation.

Thus, in an embodiment, the determination of whether any of the texture data values are the same compares data indicative of the data values of the texels (which data may be the data values themselves, or, e.g., indices indicative of (representing) the actual data values) to determine whether the texture data values are the same or not. In one embodiment the determination is entirely done by comparing data indicative of the data values of the texels.

Thus, in this case, the texture data fetching circuit will, and in an embodiment does, fetch from the cache the texture data values (and/or indices indicative of those values) that are to be used in the texture filtering operation, and the texture filtering operation selection circuit (stage) in an embodiment then compares the fetched texture data values (and/or indices) to determine whether any of the texture data values to be used in the texture filtering operation are the same or not.

Where the texture data value cache stores indices that are representative of the texels actual data values, then the data "indices" for the texels being used in the texture filtering operation are in an embodiment compared to determine whether the texels have the same "actual" data values or not. In such a case, the texture data fetching circuit (processor) in an embodiment fetches both the indices and the actual data values represented by those indices, but then the indices are compared to determine whether the texels have the same data values or not.

This comparison could compare all of the fetched data values (and/or indices) for the texture filtering operation, or it could compare only a subset of those values (for example the values that are fetched from a particular cache line, or compare values from respective different cache lines). Also, where required, an index indicative of the data value of a texel or texels could be used to fetch the actual data values for the texel or texels so as to allow that actual data value to then be compared to another texel value or values, if desired.

Thus, in an embodiment, the texture filtering operation selection circuit comprises a comparison circuit that is operable to compare data values (including indices, as required) for this purpose.

In another embodiment, the texture filtering operation selection circuit and process can, and in an embodiment does, determine whether any of the texture data values are the same using information other than (that is not) the texture data values (or other information, such as indices, representing those values), which information is indicative of whether any texture data values are the same or not (and that can be used to determine whether texture data values are the same or not).

In this case, the texture filtering operation selection circuit and operation in an embodiment then uses this texel value similarity information for the texture data values to determine whether any of the texture data elements to be used to perform the texture filtering operation have the same data value (and to then select the texture filtering operation to be performed, accordingly).

In these arrangements, the texel value similarity information should, and does in an embodiment, allow it to be determined whether texture data elements have the same value or not without the need to compare the actual data values (or information, such as indices, representing those values). Thus, in this case, the texture filtering operation selection circuit and process, when using texel value similarity information to determine whether any of the texture data elements have the same data value, will, and does in an embodiment, use that texel value similarity information to determine whether any of the texture data elements have the same data value, without the need to (and without) comparing data values (or data representing those values) themselves.

Thus, where such texel value similarity information is available and used, there would be no need to compare the texture data values (and/or, e.g. indices representing those values) themselves. Thus, this may be done instead of any comparing of the texture data values (and/or indices representing those values) themselves (and in one embodiment this is the case).

Thus in one embodiment, the determination of whether any of the texture data values are the same does not compare the texture data values (or, e.g. indices representing those values), but uses other, texel value similarity, information, associated with or for the texture data values, to determine whether any texture data values for a texture filtering operation are the same or not.

This said, it would also be possible both to use texel value similarity information to determine whether texture data values for a texture filtering operation are the same or not, and to, in addition to that, also compare texture data values (and/or indices, etc.) themselves.

For example, the operation could use "similarity" information where available for texture data values, but still compare some or all of the actual texture data values (or indices), if required. Equally, the presence of appropriate similarity information could be used to omit texture data value comparisons where the similarity information indicates that that is not necessary, but the determination process could still perform data value comparisons where it cannot be concluded from the similarity information that such comparisons are unnecessary. For example, where any similarity information indicates that texture data values are the same, there will be no need to compare those values, but where any similarity information does not indicate that, the data values could still be compared to determine if they are in fact the same.

Equally, the similarity information may indicate that respective subsets of the texels are the same, but it may be appropriate then to compare data values of those subsets to each other to determine if the data values of the different subsets are the same as each other.

Thus, in an embodiment, the determination of whether any of the texture data values are the same both uses texture data value similarity information and a comparison of data indicative of the data values (such as the data values themselves and/or indices indicative of those values).

The texel value similarity information that is other than the texture data values (or, e.g., indices representing those values) can take any suitable and desired form. In an embodiment, it is data that indicates whether texture data values are the same as each other (and that can be used to determine whether texture data values are the same or not) (and without the need to actually compare the texture data values or indices representing those values). In an embodiment it is in the form of an indicator value that indicates (that allows it to be determined) whether texels have the same value or not.

This similarity information could be used simply to indicate whether all the texture data values (texels) to be used for the filtering operation have the same value or not (in which case a 1-bit indicator, e.g., could be used), or could be able to indicate whether all or respective subsets of the texture data values (texels) have the same value or not (in which case a multi-bit indicator may be used, for example).

This texture data value similarity information can be provided to the texture filtering operation selection circuit and process in any suitable and desired manner. In an embodiment it is provided along with (at the same time as) the texture data values. In an embodiment it is provided by the texture data fetching circuit, in an embodiment at the same time as the texture data fetching circuit/process provides the texture data values to the texture filtering operation selection circuit/process.

The texture data value similarity information that is provided to the texture filtering operation selection circuit and process can be determined and derived in any suitable and desired manner.

In an embodiment, the texture data value similarity information is based on the reading of data from the cache or caches of the texture mapper cache system. This could be, for example, and in an embodiment, on the basis of information (other than the texel values themselves) that is stored in and read from a cache, and/or on whether the data is read from a particular, in an embodiment selected, cache (or not).

In one embodiment, the texture data value similarity information is derived based on metadata associated with and stored for the texture data values in a cache or caches of the texture mapper. In this case, the texture data fetching circuit (the cache lookup process) could, for example, and in an embodiment does, read the metadata for the texture data values (texels) that are being looked up, and use that metadata to derive and provide to the texture filtering operation circuit/process, appropriate texture data value similarity information for the texture data values that have been fetched from the cache.

Thus, in an embodiment, the determination of whether any of the texture data values are the same, is based, at least in part, on metadata associated with or for texture data values that can be used to determine whether texture data values are the same or not.

This metadata can take any suitable and desired form. In an embodiment it is in the form of an indicator, such as a flag or flags, that indicates (and allows it to be determined) whether texels have the same value or not.

Thus, in an embodiment, texels (texture data values) are stored in a cache of the texture mapper in association with metadata that can be used to determine whether texels being fetched from the cache for use in a texture filtering operation have the same value or not. In an embodiment, the metadata indicates whether all the texels in a cache line have the same value or not. In an embodiment, each cache line of a cache of the texture mapper is tagged with such metadata.

This is in an embodiment done for a cache in which each cache line can store a plurality of texels (texture data values) as separate, discrete entries (data units) (as discussed above).

Thus, in an embodiment the texture mapper includes a cache in which each cache line can store a plurality of texels (texture data values) as separate, discrete entries (data units), and each cache line of the cache has associated "constant value" metadata (e.g. flag/bit), in an embodiment as part of the tag for the cache line, which when set (to a particular value) indicates that all the texels in the cache line in question have the same data value (and vice-versa).

In this case therefore, when a texture filtering operation is to use a plurality of texels from the same cache line, the "constant value" bit for that cache line can be checked to determine whether all those texels will have the same value or not.

Thus, in an embodiment, when the texture data fetching circuit (and operation) is fetching the texture data values (texels) for use in a texture filtering operation from such a cache of the texture mapper in which each cache line has associated with it an indicator (metadata) that can be set to indicate when all the texels stored in the cache line have the same data value or not, the texture data fetching circuit uses the "constant" value indicator for each cache line from which texel values have been fetched to provide to the texture filtering operation selection circuit (stage), texture data value similarity information indicating whether the texels have the same value or not, with the texture filtering operation selection circuit (stage) then using that information to select the texture filtering operation accordingly.

In an embodiment, the texture data fetching circuit (the cache lookup process) fetches both the "constant value" indicators (flags) and the texels (the texel values) that are required for the texture filtering operation, uses the "constant" value indicator for each cache line from which texel values have been fetched to provide to the texture filtering operation selection circuit (stage) texture data value similarity information indicating whether the texels have the same value or not, and provides both the texture value similarity information and the texel values to the texture filtering operation selection circuit (stage), with the texture filtering operation selection circuit (stage) then assessing the texture value similarity information (and, optionally, the data values themselves), and selecting the texture filtering operation to be performed accordingly, and then providing the required texture data value (texels) to the texture filtering circuit (stage) accordingly.

In this case, the texture data value similarity information could, as discussed above, simply indicate whether all the texel values are the same in the case where the texels being used are fetched from the same cache line of the texture mapper and which has its "constant" value bit (flag) set to indicate that all the texels in the cache line in question have the same data value, or more sophisticated arrangements could be used, for example to indicate that respective subsets of the texels have the same data value, e.g. in the case where the texels to be used are fetched from two (or more) different cache lines, but with each cache line itself being indicated as storing texels all having the same value (within that cache line). Other arrangements would, of course, be possible.

In these arrangements, the "constant value" flags (indicators) for the cache lines in the texel cache can be set as desired.

In an embodiment, the cache system of the texture mapper is operable to fetch blocks of texels from the memory system when new texture data is required (i.e. for texels that are not already stored in the cache), and it is determined whether all the texels in the block of texels that is being fetched have the same data value or not, with the texels for the block of texels then being (exclusively) stored in the same cache line or lines (in the case where the block is more than one cache line's worth of texels) of the texel cache and the constant data value flag for that cache line (or lines) being set accordingly.

In this case, therefore, a cache line will have its constant data value flag set when it is first filled with texel data, as appropriate.

It would also be possible in these arrangements to allow an additional texel or texels to be added to a cache line (e.g., and in an embodiment, where the cache line has spare capacity and the new texel or texels are contiguous with the texels that are already stored in the cache line in question). In this case, when a new texel is to be stored in an (existing) cache line, the data for that texel could be, and is in an embodiment, compared with the data values of texels already stored in the cache line in question (at least in the case where all the texels in the cache line currently have the same data value and so the constant data value flag is set), to determine if the new texel has the same data value as all the other texels in the cache line (or not), with the constant value flag for the cache line then being left as indicating that all the texels in the cache line have the same data value, or unset to indicate that the texels in the cache line have different data values, accordingly.

In another embodiment, the texture data value similarity information is derived based on the particular cache of the texture mapper that the texel data values are fetched from. For example, and in an embodiment, in the case where the cache system of the texture mapper includes a constant data value (texel) region cache (as discussed above), then the texture data value similarity information could be based on whether the texture data values are being fetched from a line of the constant data value region cache (or not).

Thus, in the case where the cache system and texture mapper includes a constant data value (texel) region cache (as discussed above), then the texture data fetching circuit (and process) is in an embodiment configured to generate texture data value similarity information for providing to the texture filtering operation selection circuit and process based on, and that indicates, whether the data values of any or more than one or all of the texels to be used for the texture filtering operation have been fetched from the constant data value region cache (and, e.g., and in an embodiment, whether they have been fetched from the same cache line within that cache) or not. For example, and in an embodiment, the texture data value similarity information could be based on, and indicate, whether all the texels have been fetched from the same cache line within the constant data value region cache, or whether some of the texels have been fetched from the same cache line.

In this case, the texture data value similarity information could, as discussed above, simply indicate that all the texel values are the same in the case where the texels being used are fetched from the same cache line of the constant data value region cache, or more sophisticated arrangements could be used, for example to indicate that respective subsets of the texels have the same data value in the case where the texels to be used are fetched from two (or more) different cache lines of the constant data value region cache.

In this case, the texture filtering operation selection circuit (stage) could then use the texture data value similarity information indicating whether any (and, e.g., what) texels' data values have been fetched from the same cache line within the constant data value region cache to select and set the texture filtering operation to be performed accordingly.

Thus in the case where the cache system and texture mapper includes a constant data value (texel) region cache, then the texture data fetching circuit (stage) in an embodiment, as well as fetching the data value (or the data value index and the corresponding data value) for a constant data value region cache line and providing that data value (and data value index) to the texture filtering operation selection circuit stage, also provides to the texture filtering operation selection circuit (stage) data value similarity information based on, and indicating, that the data values have been fetched from a cache line of the constant data value region cache (and in an embodiment so as to indicate which of the texels for the filtering operation have been fetched from the same cache line of the constant data value region cache). The similarity information could, e.g., be propagated as some additional control signalling alongside the data that has been looked up.

In these arrangements, the texture data value similarity information could be based solely on whether texture data values are being fetched from a constant data value region cache (or not). In an embodiment, the texture data similarity information may be, and is in an embodiment, derived based on whether the texel data values are being fetched from a constant data value region cache and any constant data value metadata from any other cache (as discussed above) that texel data values are being fetched from.

Correspondingly, in the case where texel values are being fetched from two (or more) different cache lines in a constant data value region cache, and/or where texel values are being fetched both from a constant data value region cache and from another, e.g. individual texel cache, the texture filtering operation circuit and process could both use any provided texture data value similarity information and operate to compare the data values (and/or indices) from the different cache lines in the constant data value region cache and/or of texels from any other cache or caches, to see if they are the same or not, if desired.

It will be appreciated from the above, that the process of loading data from memory into the cache(s) of the texture mapper may, and in an embodiment does, involve determining whether the data values being loaded are the same (as each other and/or to data values already stored in the cache(s)), e.g. and in an embodiment, so as to determine which cache to store the texels (their data values) in, and/or whether to set metadata for a cache line to indicate that all the texels in the cache line have the same value.

Thus, the cache system of the texture mapper in an embodiment includes appropriate texel value evaluation circuitry (circuit) that is operable to perform this operation when texels are fetched from the memory and before they are loaded into one of the cache(s).

Thus, in an embodiment, the cache system of the texture mapper comprises a texture data element value (texel) comparison circuit (and stage) that is operable to compare the data values of texels (e.g. of texels of blocks or sets of texels) fetched from the memory system to each other, and to select a cache to store the texels (their data values) in, and/or to set constant data value metadata (flags) associated with cache lines in a texel cache, accordingly (on the basis of the data value comparison).

In an embodiment, the texture data value comparison circuitry (stage) can also compare the value of a new texel or texels fetched from the memory system to the value or values of texels that are already stored in a texel cache (before loading the texels into the texel cache).

This texture data value (texel) evaluation, e.g., comparison, circuit (stage) is in an embodiment located after (and operates after) any texel loader and texel decoder (decompressor) (discussed above).

In an embodiment, this texel value evaluation, e.g. comparison, circuit and operation is operable to and configured to use any information, such as metadata, that may be associated with or derivable from a texture stored in the memory that is indicative of constant data value regions in the texture, so as to identify constant data value regions and/or texels having the same data values that are being fetched from a texture stored in the memory (and to then place that data in the cache or caches of the texture mapper accordingly), without, e.g., and in an embodiment, the need to compare the actual texel values.

For example, the Applicants have recognised that in the case of, for example, particular compression formats for textures, those compression formats may, in effect, identify or explicitly encode regions of constant data value (e.g. constant colour) within a texture. Thus, when using such an encoded (compressed) texture, the indications in the encoding scheme of texture regions of constant data value can be, and are in an embodiment, used directly to identify sets of texels being fetched that will have the same data values. Correspondingly, where such a constant data value region is identified, that entire region can be allocated a cache line in the constant texel region cache, if desired.

The texel value evaluation circuit could only use such encoding information, but is in an embodiment able both to use such information and to compare texel values (e.g. if required).

In an embodiment, the cache system of the texture mapper includes both a constant data value (texel) region cache of the form discussed above, and a cache that is configured to store individual texture data elements (texels) (as discussed above). In this case, the cache that stores individual texels may also have associated with each cache line a constant data value flag (as discussed above), but need not do so.

Once the texture filtering operation selection circuit (stage) has assessed the texel values and selected the texture filtering operation to be performed, it sets the texture filtering circuit (stage) to perform the texture filtering operation that is to be performed, and provides the required texture data (texel) value(s) to the texture filtering circuit (stage) for the selected operation to be performed. This may include using a texture data value index stored in a cache to lookup (fetch) the required data value before providing it to the texture filtering circuit (stage), where appropriate.

For example, and as discussed above, where constant colour texels are identified, then zero or more of the component linear interpolations (that make up an overall bilinear or tri-linear filtering process) would be omitted, depending on which texels have the same values.

In an embodiment, four texel values are returned per bilinear lookup, together with appropriate similarity information indicating the constant colour state, and the texture filtering operation selection circuit then sets the texture filtering operation to be performed accordingly (as it will have everything it needs to select the filtering operation, and the input data needed for that operation).

The texture filtering circuit (stage) then performs the selected texture filtering operation, using the texture data value(s). The texture mapper will then return the texture filtering operation output result to the processor (process) (e.g. renderer/fragment shader) that requested the texture mapping operation, for use (e.g. for applying as a texture to a sampling position or positions being rendered).

Although the technology described herein has been described above primarily with reference to a single, individual texture mapping and texture filtering operation (e.g. for a given sampling position in a render output), in practice when generating a render output, a given texture mapping operation will be repeated for plural output (e.g. sampling) positions, e.g. across the entire area of the render output being generated. Thus the technology described herein is in an embodiment performed in respect of plural texture mapping operations, such as, and in an embodiment, for each of plural sampling positions in a render output being generated.

As discussed above, the texture filtering operation that is to be performed using plural texels is in an embodiment triggered by means of an appropriate texture mapping operation request provided to the texture mapper, in response to which the texture mapper will perform the texture filtering operation.

In an embodiment, such texture mapping operation requests are sent by a renderer associated with the texture mapper (a rendering stage of a graphics processing pipeline that is associated with the texture mapper). In an embodiment, the texture mapping operation requests are sent to the texture mapper by a renderer of a graphics processor that the texture mapper is also part of.

In an embodiment, the renderer is in the form of a (programmable) fragment shader, and the texture mapping operation requests are sent to the texture mapper by the fragment shader in response to the execution of an appropriate texturing operation instruction in a shader program that the fragment shader is executing.

The texture mapping operation request (and texturing operation instruction), in an embodiment indicates any required state and/or control information needed for performing the texture mapping operation, such as the texture filtering operation to be performed (e.g. the texture filtering mode (e.g. bilinear, trilinear, etc.) to be used), the texture to be used for the texturing operation, and a sampling position or positions in the texture in respect of which the texture filtering operation should be performed.

This information may be provided, for example, and in an embodiment, in the form of one or more "descriptors", that, e.g., indicate one or more input parameters (texturing operation settings (control data)), that define (aspects of) the texture mapping operation to be performed. The descriptors may be contained in the request/instruction and/or may be stored (e.g. in memory).

Thus, in an embodiment, the texture mapper includes data processing circuitry (circuit) operable to receive texture mapping operation requests (instructions) and to, in response to receiving a texture mapping operation request (instruction), control the texture mapper to fetch texels (texture data values) on which the texture mapping operation is to be performed, and to cause the texture mapper to perform the texture mapping operation on the fetched set of texels (texture data values).

The texture mapper may also be operable to fetch, and may fetch, the descriptors and/or input parameters required to perform a texture mapping operation, e.g. from memory, in response to a request to perform a texture mapping operation.

In an embodiment, the texture mapper performs its texture mapping and thus filtering operations for sets of plural sampling positions together (at the same time) (and in an embodiment for "quads" of four (2×2) sampling positions). (The Applicants have recognised in this regard that in many graphics processing systems and standards, texturing operations may frequently consider plural, and in particular 2×2 "quads" of, sampling positions together, for example for the purposes of calculating derivatives (e.g. along the x and y axis). The texture mapping operation of the technology described herein is therefore in an embodiment configured to process texture mapping operations for sets of plural sampling positions together.)

In this case, a texture mapping operation will be performed in parallel for a set of plural sampling positions that are executing the same texture mapping operation (but that will each be sampling the texture on their own respective set of (texture) coordinates (which may be different to or the same as the coordinates for one or more of the other sampling positions in the set)).

In this case, the operation of the technology described herein discussed above could be, and is in an embodiment, performed for each of the sampling positions for which the texture mapping operation is being performed together. Thus, where four texture mapping operations are being performed for a quad of 2×2 sampling positions, the operation of the technology described herein discussed above could be, and is in an embodiment, performed for each of the sampling positions.

In an embodiment, it is also or instead, and in an embodiment also, determined whether any of the different sampling positions that are being processed together (in parallel) are in fact using (all) the same texture data values (e.g. in one or more of the manners discussed above), with the process then operating to, in the case where it is determined that two (or more), e.g. all, of the sampling positions are processing the same texture data values, perform the texture mapping operation for only one of those sampling positions (and then sharing the result to (for) all the sampling positions that were using the same texture data values).

The technology described herein can be used for and with any desired form of texture data that can be processed by a graphics texture mapper. Thus it can be used where the textures represent appropriate colour values (e.g. RGBα values) (and in one embodiment this is the case), such as images, but also in the case where the texture data represents other graphics processing parameters and data that may be used when generating a render output, such as depth values, etc., or in the case where the texture data represents other (non-graphics) processing parameters and data (e.g. where the texture processing is being used to perform other) (non-graphics) data processing operations.

Correspondingly, the operation in the manner of the technology described herein can be used for any suitable and desired form of texturing operation and graphics (or other) processing operation that may be performed using textures, such as, and in an embodiment, to generate frames (images) for display, but also to generate other, e.g. non-graphics, outputs.

The texture mapper (texture mapping apparatus) is in an embodiment part of a graphics processor. Thus, according to another embodiment of the technology described herein there is provided a graphics processor comprising a graphics texture mapping apparatus that comprises:

a texture data fetching circuit operable to fetch data values for a plurality of texture data elements to be used in a texture filtering operation;

a texture filtering circuit operable to perform a texture filtering operation using texture data element values fetched by the texture data fetching circuit to provide a texture filtering operation output result; and a texture filtering operation selection circuit configured to, when the texture mapping apparatus is to perform a texture filtering operation that uses the data values of a plurality of texture data elements to provide a texture filtering operation output result:

determine whether any of the data values of the texture data elements to be used for the texture filtering operation are the same;

select a texture filtering operation to be performed using data values of the texture data elements based on the determination; and cause the texture filtering circuit to perform the selected texture filtering operation using one or more of the data values of the texture data elements to provide the texture filtering operation output result.

As will be appreciated by those skilled in the art, these embodiments of the technology described herein can, and in an embodiment do, include any one or more or all of the features of the technology described herein described herein, as appropriate.

The graphics processor may include any one or more or all of the processing stages that a graphics processor (processing pipeline) can normally include. Thus, for example, the graphics processor may include a primitive setup stage, a rasteriser and/or a renderer.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages that a graphics processing pipeline may contain such as a depth (or depth and stencil) tester(s), a blender, a tile buffer or buffers, a write out unit, etc.

The texture mapper and texture mapping apparatus could also be a co-processor of a CPU, for example (i.e. coupled with a CPU that executes a rendering pipeline, for example), if desired.

The graphics processor and/or texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise the memory or memories (memory system) referred to herein, which may be external to the graphics processor and texture mapping apparatus. As discussed above, the memory or memories may be operable to store, and may store, a set of textures (texture maps) to be used in texturing operations.

Thus, as will be appreciated, embodiments of the technology described herein may be implemented in a data/graphics processing system comprising a memory and a graphics processing unit (GPU) (a graphics processor) comprising a texture mapping apparatus as described herein. In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The data/graphics processing system and/or graphics processor and/or texture mapping apparatus may also comprise, and/or be in communication with, one or more memories and/or memory devices that store the data described herein, and/or that store software for performing the processes described herein. The data/graphics processing system and/or graphics processor and/or texture mapping apparatus may also be in communication with a host microprocessor, and/or with a display for displaying images based on the data generated.

The technology described herein can be used for any form of output that a graphics texture mapper and graphics processor may be used to generate. In one embodiment it is used when a graphics processor is being used to generate images for display, but it can be used for any other form of graphics processing output, such as (e.g. post-processed) graphics textures in a render-to-texture operation, etc., that a graphics processor may produce, as desired. It can also be used when a texture mapper, graphics processor, etc., is being used to generate other (e.g. non-image or non-graphics) outputs.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired.

Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, the technology described herein relates to texture mapping in graphics processors.

Figure 3:
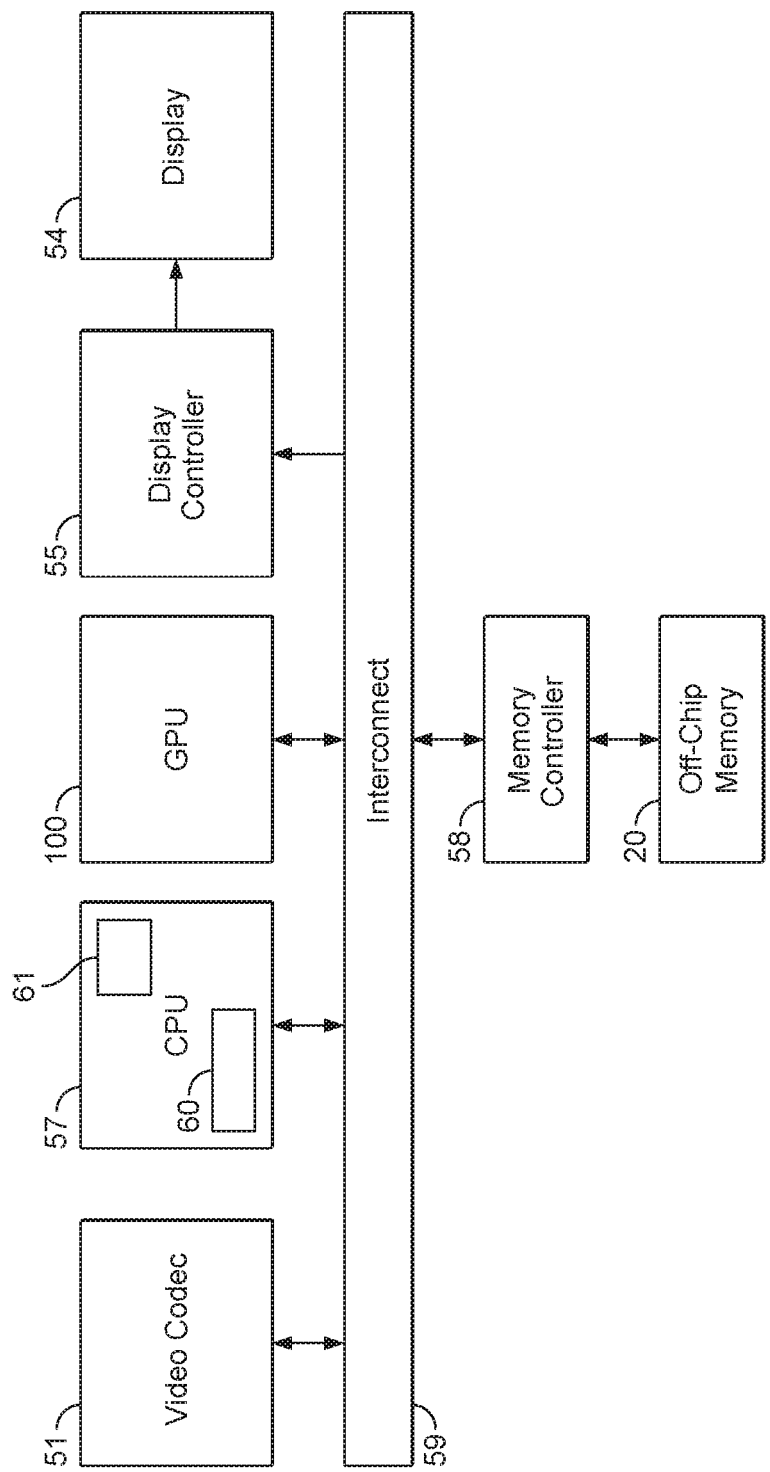
FIG. 3 shows an exemplary data processing system in which the technology described herein may be implemented.

FIG. 3 shows an exemplary data processing system in which the technology described herein and the present embodiments may be implemented.

The exemplary data processing system shown in FIG. 3 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

In this data processing system, the graphics processor (GPU) 100 may be of the form shown in FIG. 1, for example.

Thus the graphics processor 100 will include a texture mapper that is operable to perform texture mapping operations in response to requests for such operations from a fragment shader (renderer) (as shown and discussed above in relation to FIGS. 1 and 2, for example).

Figure 4:
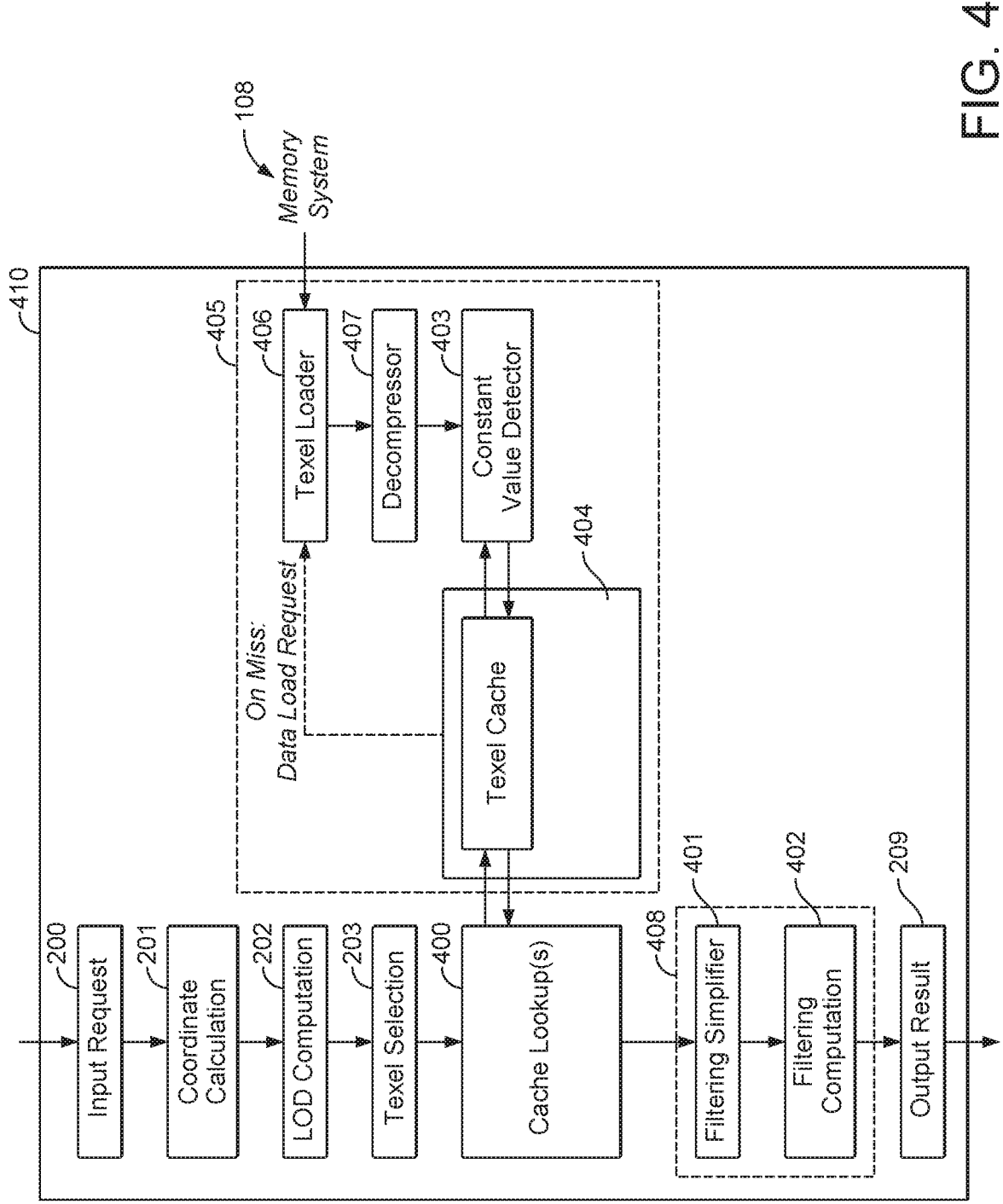
FIG. 4 shows a texture mapping apparatus according to an embodiment of the technology described herein.

FIG. 4 shows a first embodiment of a texture mapper 410 for a graphics processor 100 that is in accordance with the technology described herein. This texture mapper 410 may be used as the texture mapper in the graphics processor 100 shown in FIG. 1, for example.

Figure 2:
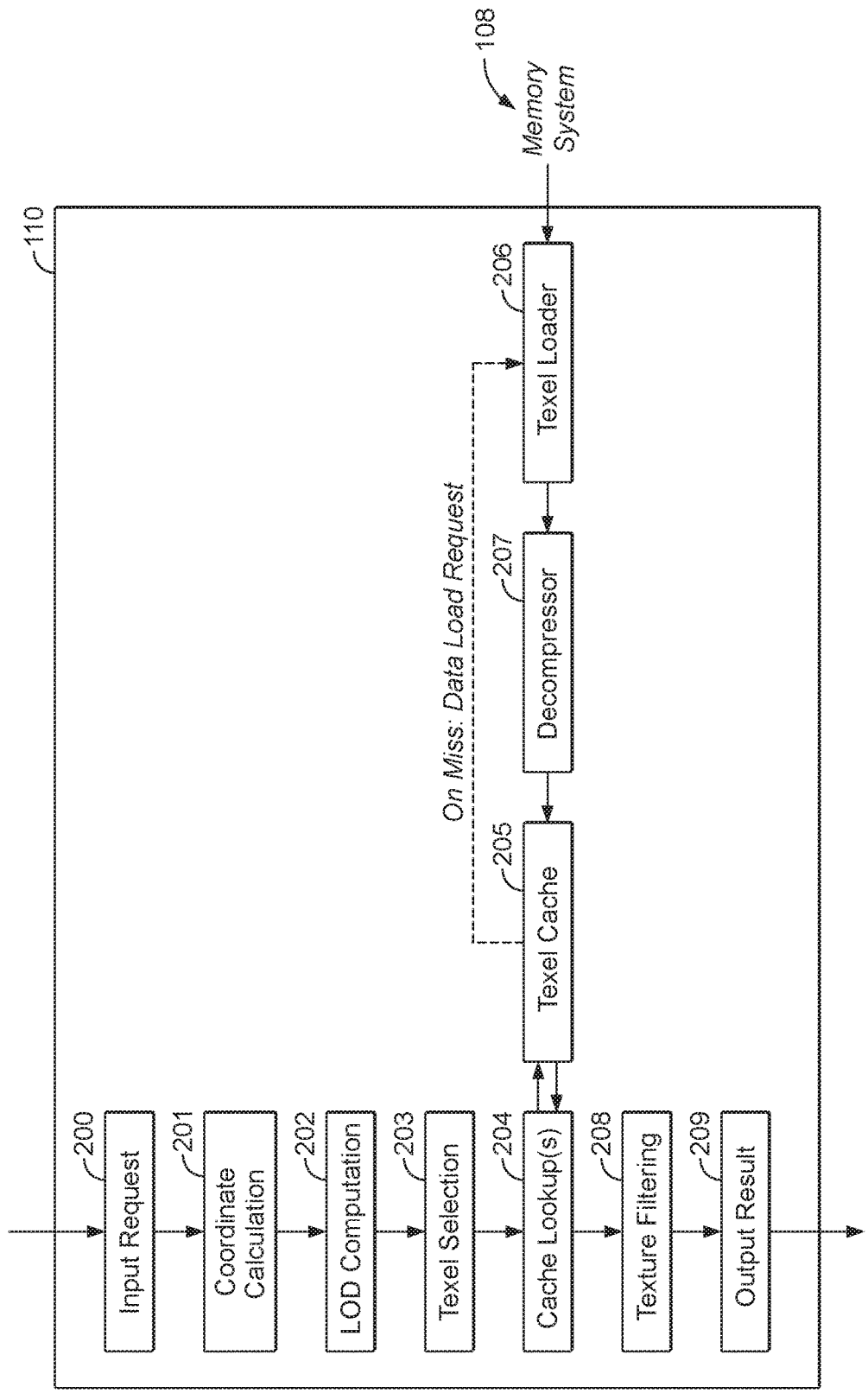
FIG. 2 shows schematically an exemplary graphics texture mapper in more detail.

As can be seen from FIG. 4, the texture mapper 410 has similar components and operations to the exemplary texture mapper illustrated in FIG. 2. Thus, like reference numerals have been used for like components in the texture mapper 410 of this embodiment where those components correspond to the components of the texture mapper 110 shown in FIG. 2 and described above.

Correspondingly, the following description will focus on the differences of the texture mapper 410 of the present embodiment when compared to the exemplary texture mapper 110 shown in FIG. 2.

Thus, as shown in FIG. 4, the texture mapper 410 of this embodiment includes an input request stage (circuit) 200 that receives texture mapping operation requests from the renderer (fragment shader) 104 of the graphics processor 100. There is then a coordinate calculation stage (circuit) 201 that calculates the appropriate coordinate(s) to be used when fetching the required texels (texture data), and a level of detail computation stage (circuit) 202, that will (if required) determine the level of detail in which the texture is to be sampled for the texture mapping operation. This is followed by a texel selection stage (circuit) 203 which uses the coordinate(s) determined by the coordinate calculation stage 201 to determine the actual texels (texture data elements) (and, if appropriate, the mipmap levels) to be used for the texture mapping operation.

The required texels (their data) are then fetched by the cache lookup stage (circuit) (the texture data fetching circuit) 400 of the texture mapper 410 from a texel cache 404 of a cache system 405 of the texture mapper 410. In the present embodiment, the cache lookup circuit 400 can fetch texels for two bilinear filtering operations (so two sets of four texels each) at the same time (in the same processing cycle).

As shown in FIG. 4, the cache system 405 of the texture mapper 410, as well as including the texel cache 404, also includes a texel loader (texel loading circuit) 406 that is operable to load data of texels from a texture stored in the memory system 108 for storing in the texel cache 404, a decompressor stage (circuit) 407 that can decompress texels that are stored in a compressed format in the memory system 108 for storing in the texel cache 404, and a constant value detector stage (circuit) 403 that is operable to determine if texels fetched from the memory system 108 have the same value or not (this will be discussed further below).

As shown in FIG. 4, the cache lookup circuit 400 requests texels (the data values of texels) needed for a texture filtering operation from the texel cache 404, and when those texels are not already present in the texel cache 404 (there is a cache miss), a data load request is sent to the texel loader 406 to load the required texels from the texture in the memory system 108 into the texel cache 404. (The texels may be loaded from the main memory itself, or from a cache, such as the L2 cache, of the memory system cache hierarchy.)

In the present embodiments, the texels are organised in the texel cache 404 by reference to their coordinates (positions) in the texture. Thus, each cache line in the texel cache 404 stores (data of) a plurality of texels that are from contiguous positions in the texture in question, and that are accordingly tagged (identified) by reference to their position in the texture (texture coordinates) (in contrast, e.g., to being identified and tagged by reference to the memory address at which the texels are stored).

In view of this, the cache lookup circuit 400 addresses the texel cache 404 using the coordinates of the texels whose data is required for the texture filtering operation. Correspondingly, the texture loader 406 is operable to convert texture coordinate-based misses in the texel cache 404 into memory address-based data fetches from the memory system 108.

In the present embodiment, as well as each cache line in the texel cache 404 being tagged (identified) by means of an appropriate set of texture coordinates, each cache line also stores in its tag, a flag (metadata) indicating whether all the texels stored in the cache line have the same data value or not. (As will be discussed further below, this constant data value flag is used to control the performance of texture filtering operations using texels in the texel cache 404.)

Figure 5:
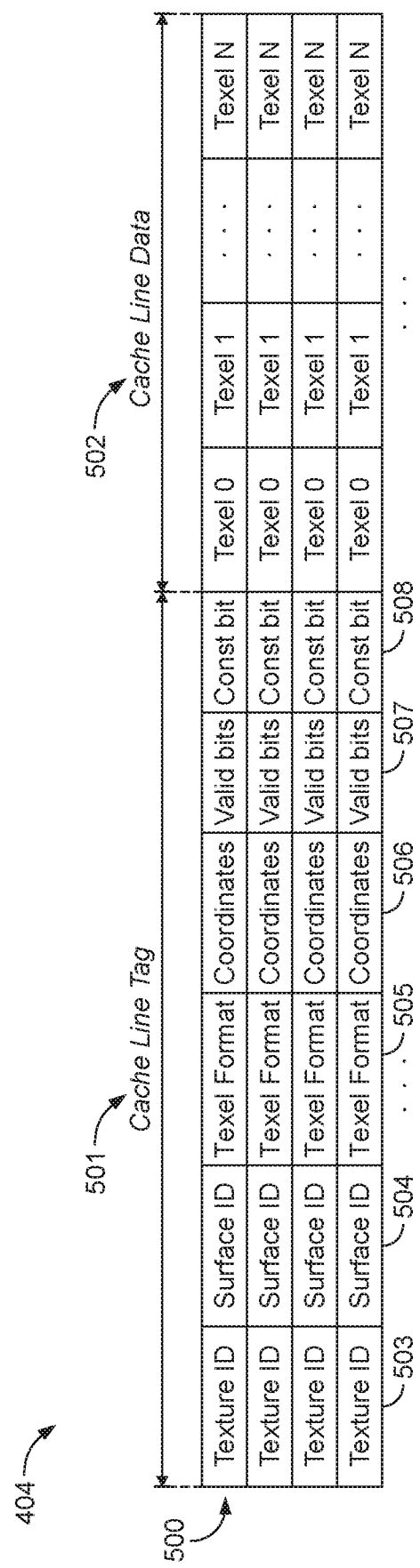
FIG. 5 shows the configuration of the texel cache in the embodiment shown in FIG. 4.

FIG. 5 illustrates this, and shows the configuration of the texel cache 404 in this embodiment.

As shown in FIG. 5, the texel cache 404 includes a plurality of cache lines 500 (four cache lines are shown in FIG. 5, but the number of cache lines in the texel cache 404 may be as desired), with each cache line having a corresponding tag 501 that can be used to identify the data in the cache line, and storing data for plural (e.g. up to 16) texels 502.

As shown in FIG. 5, each cache line 500 is tagged with, in this embodiment, the following data fields to allow the texel data that is stored in the cache line to be identified: the identity of the texture 503 that the texels in the cache line relate to; the surface 504 within that texture that the texels in the cache line relate to (e.g. where the texture is in the form of a set of mipmaps) (this could indicate, e.g., which mipmap, cubemap or array texture to use (i.e. give an appropriate surface indication for any higher order texture type that has multiple surfaces)); and a set of texture coordinates 506 identifying the position in the texture of the texels stored in the cache line.

As shown in FIG. 5, each cache line tag 501 also includes other metadata, such as an indication of the texel format 505 of the texels in the cache line, and a set of valid bits 507 indicating whether data in the cache line is valid or not.

Finally, each cache line tag 501 includes a "constant value bit" (flag) 508 that can be set to indicate that all the texels in the cache line have the same data value. For example, the constant data value bit (flag) could be set to 1 if all the texels in the cache line have the same data value, but set to 0 otherwise.

In order to set the constant data value bits (flags) 508 in the cache lines of the texel cache 404, as shown in FIG. 4 the cache system 405 of the texture mapper 410 further includes a constant value detector (circuit) 403 that is operable to compare values of texels being loaded from the memory system 108 into the texel cache 404.

In the present embodiment, the texel loader 406 is configured to load blocks of contiguous (adjacent) texels from a texture in memory system 108 when performing a texel fetch from the memory system 108 (thus the texel loader 406 will, when it requires a particular texel, in practice load a block of texels that contains the particular texel that is required).

The loaded texels are then decompressed by the decompressor 407, if necessary, and then the texel values of all the texels in the block are compared by the constant value detector 403 to determine if all the texels in the block have the same value or not. In the case that all the texels in the block have the same value, then those texels are stored in an (available) cache line in the texel cache 404 and the constant data value flag 508 for that cache line is set to show that all the texels in the cache line have the same data values.

(Correspondingly, when it is determined by the constant value detector circuit 403 that not all the texels in the block have the same value, the block of texels is still stored in a given cache line of the texel cache 404, but the constant data value flag for that cache line is not set to indicate that all the texels in the cache line have the same data value.)

It would also be possible, if desired, for the texel loader and texel loading process to be able to add new texels to an existing cache line (to a cache line that is already storing valid texels) in the texel cache 404, if desired.

To do this, the constant value detector 403 may be operable to identify the coordinate of a texel that has been loaded from the memory system and to identify whether there is a corresponding cache line in the texel cache 404 storing texels contiguous with the coordinate of that new texel, and to, if so, then compare the value of the new texel to be stored in the cache line in question with the values of the texels already stored in the cache line. If the comparison determines that the value of the new texel is the same as the values of all the texels already stored in the cache line, then the constant value bit (flag) 508 for the cache line is left in its "constant value" state, but if not, then the new texel is either stored in a new cache line (if one is available), or if it needs to be added to the existing cache line, the constant data value bit (flag) 508 for the cache line is unset (i.e. changed to indicate that the data values in the cache line are not the same).

In this arrangement, it may be preferred to try to maintain constant texel values within a cache line so far as is possible, so new texels having different values are in an embodiment stored in different cache lines (where available).

In the case where a cache line 500 stores plural texels having the same value, then there could be a separate data value (entry) stored for each texel, or, for example, only a single example of the same data value could be stored (e.g. at the first texel position in the cache line), with the cache lookup operation then being modified to, where necessary, read that single stored texel value multiple times.

In operation of this embodiment, the cache lookup circuit 400 will fetch the required texel data values from the cache 404 (so four values in the case of a bilinear filtering operation, for example), but will also read the constant data value bit (flag) from the cache line or cache lines that it is reading the texels from, and use that constant value flag(s) (metadata) to derive texel data value similarity information, which texel data value similarity information it will then provide together with the texel values to a texture operation circuit 408.

As shown in FIG. 4, in this embodiment the texture operation circuit 408 comprises two stages (circuits), a "filtering simplifier" circuit (stage) 401, followed by a filtering computation circuit (stage) 402.

The filtering simplifier circuit (stage) 401 acts as a texturing filtering operation selection circuit (stage), and uses the texture data value similarity information received from the cache lookup circuit 400 to determine whether any of the texel values to be used in the texture filtering operation being performed have the same value or not, and then selects and sets the texturing filtering operation that the filtering computation circuit 402 performs using the looked-up texel values accordingly.

The filtering computation circuit (stage) 402 acts as the texture filtering operation circuit and performs the selected texture filtering operation, using the necessary texel values.

The filtering computation circuit 402 includes, e.g., a weights calculation circuit that calculates interpolation weight values for a texture filtering operation, and a filtering circuit that can multiply respective texel data values by respective weight values and combine the results of the multiplications to provide an output value for the filtering operation in question.

In this embodiment, the filtering computation circuit 402 can perform either two bilinear filtering passes in parallel (e.g. for two bilinear processing operations or for a single trilinear processing operation). In either case, 8 weight values are applied to 8 input data values per cycle of operation.

The result of the selected texture filtering operation is then appropriately packaged by the result output circuit 209 and returned to the texture mapping operation requester (the renderer/fragment shader), as appropriate.

The texture data value similarity information that is provided by the cache lookup circuit 400 to the filtering simplifier circuit 401 should allow the filtering simplifier circuit (the texture filtering operation selection process) to determine whether any of the texel values for the filtering operation are the same.

To do this, the cache lookup circuit 400 could simply identify whether all the texel values for the texture filtering operation have been fetched from a single cache line of the texel cache 404 for which the constant data value bit flag is set to indicate that all the texels in the cache line have the same value, with the cache lookup circuit 400 then sending texture data value similarity information to the texture operation circuit 404 indicating that all the texels for the texture filtering operation have the same data value (or otherwise sending texture data value similarity information indicating that the texture operation circuit 408 should assume that all the texels have different data values).

Alternatively, more sophisticated texture data value similarity information could be sent to the texture operation circuit 408, if desired. For example, if only some but not all of the texture data values come from a cache line for which the constant data value bit (flag) was set, the texture data value similarity information could be configured to indicate that those texels have the same data value, but the other texels have different data values. It would also be possible, for example, to indicate the presence of plural subsets of texture data values having the same value (but different to other subsets of the texture data values), if desired.

The filtering simplifier circuit (stage) 401 can use the texture data value similarity information to select the filtering operation to be performed in any suitable and desired manner. For example, if that information indicates that all the texels have come from a cache line for which all the texels have the same data value, then the filtering simplifier circuit can select (and simplify) the texture filtering operation accordingly.

The filtering simplifier circuit (stage) 401 could also be operable to compare texture data values that are to be used for a texture filtering operation, in addition to using the similarity information, if desired, such that, for example, data values are only actually compared in the case where it cannot be determined from the similarity information that the data values have the same value. Thus, for example, the similarity information could be used to reduce or omit some or all of the data value comparisons, where it is possible to do that.

As discussed above, in this embodiment, the filtering simplifier circuit 401 (the texture filtering operation selection circuit) is operable to select the texture filtering operation (computation) to be performed by the texture filtering circuit 402 in dependence upon whether any of the texels to be used for the texture filtering operation have the same value or not.

FIGS. 6-11 illustrate this and show exemplary simplifications of texture filtering operations in the case where some or all of the texel values to be used in the texture filtering operation are the same.

Figure 6:
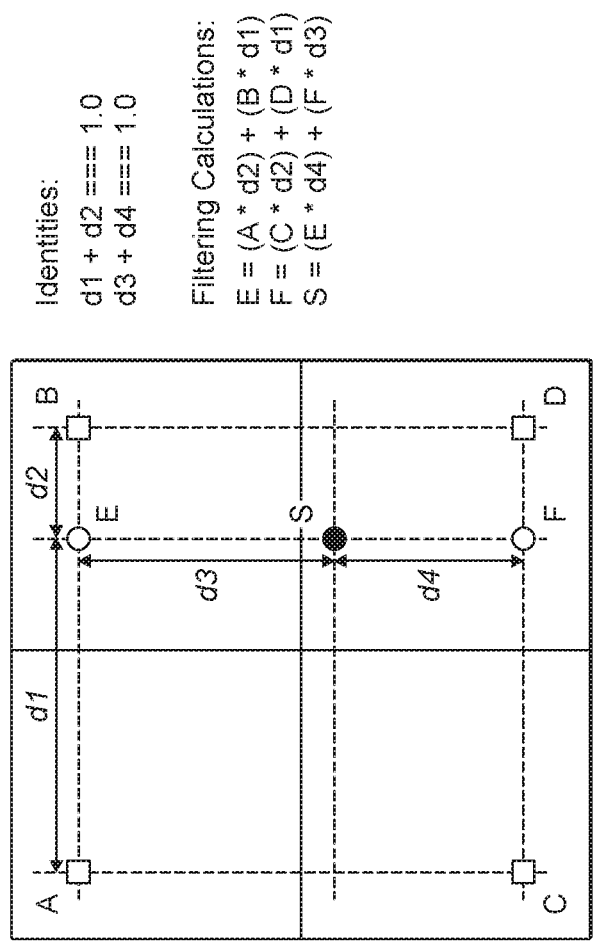
FIGS. 6 to 11 show exemplary texture filtering operations that may be performed in embodiments of the technology described herein.

FIG. 6 shows a conventional bilinear filtering operation, in which four texels A, B, C and D are bilinearly filtered to provide a value at a desired sampling position S. As shown in FIG. 6, this operation conventionally requires three sets of linear interpolations (and also conventionally assumes that the distances between the texels that are being bilinearly sampled will be set to 1).

Figure 7:
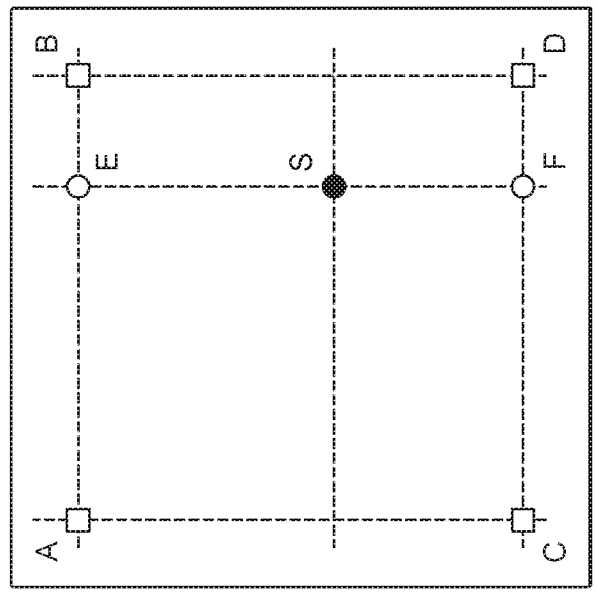

FIG. 7 shows a first simplification of the bilinear filtering operation shown in FIG. 6 that can be used when all four texels A, B, C and D to be bilinearly filtered have the same value. In this case, as shown in FIG. 7, the bilinear filtering operation can instead be performed by simply taking the value of one of the texels directly (e.g. by performing a nearest sampling operation).

Figure 8:
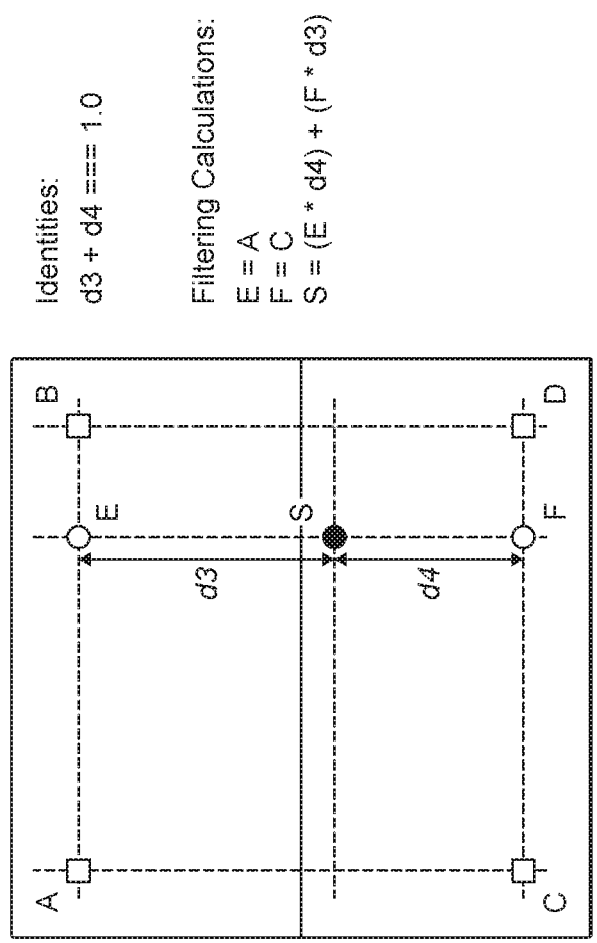

FIG. 8 shows another situation in which the top two texels A and B have the same value, and the bottom two texels C and D have the same value (but different to the value of A and B). In this case, as shown in FIG. 8, the bilinear filtering operation can be simplified by performing the first two linear interpolations by simply selecting the value of one of the texels involved.

Figure 9:
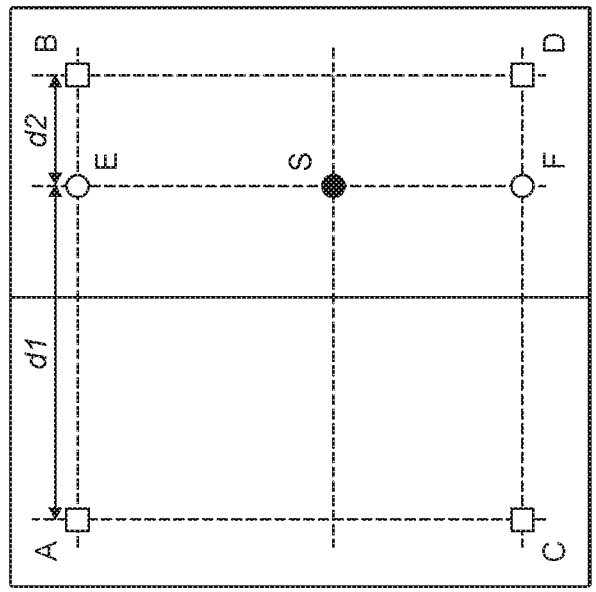

FIG. 9 shows the corresponding situation where the respective vertical pairs of texels have the same values as each other (so texel A has the same value as texel C, and texel B has the same value as texel D).

(In the case that none of the texel values are the same, then the "normal" bilinear filtering operation shown in FIG. 6 can be selected and performed.)

Figure 10:
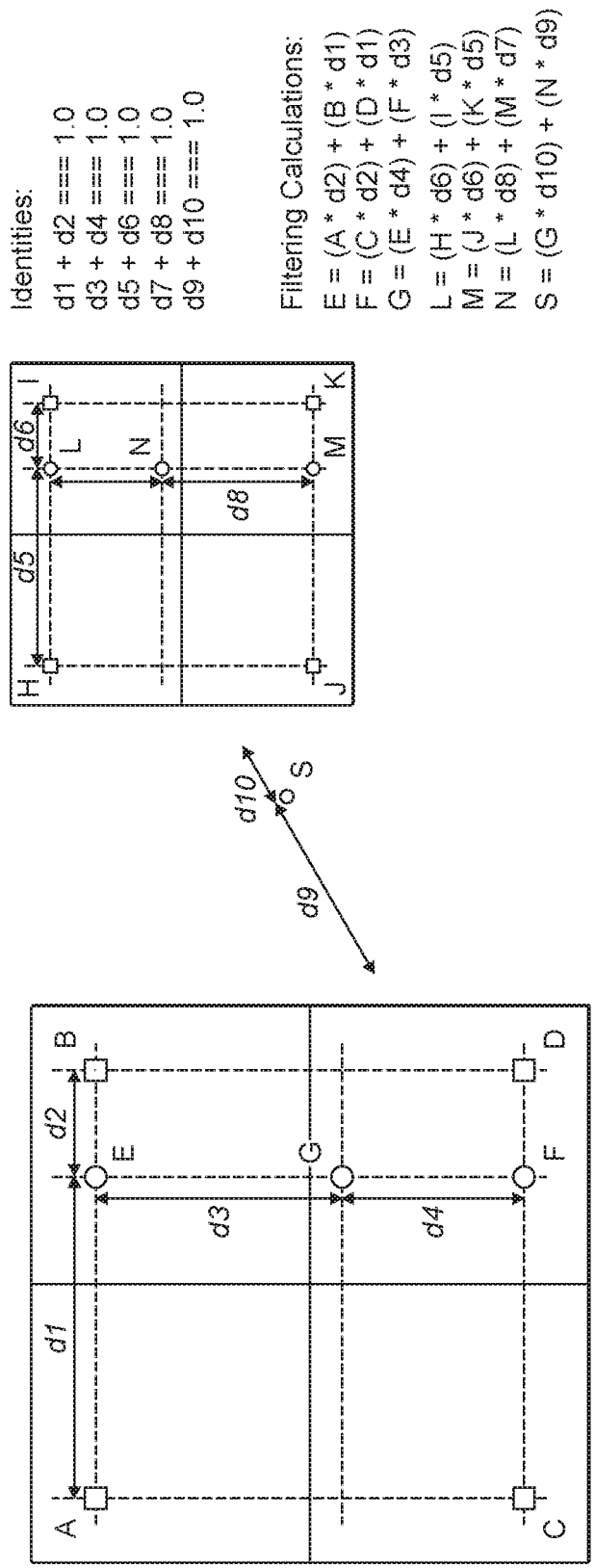

FIG. 10 shows a standard trilinear filtering operation in which a bilinear filter is taken from each of two mipmap levels of the texture and are then combined based on a level of detail (LOD) distance weight between the mipmap levels. Again, it is assumed in this case that the distances between each respective pair of texels and the level of detail distance is set to 1.

Figure 11:
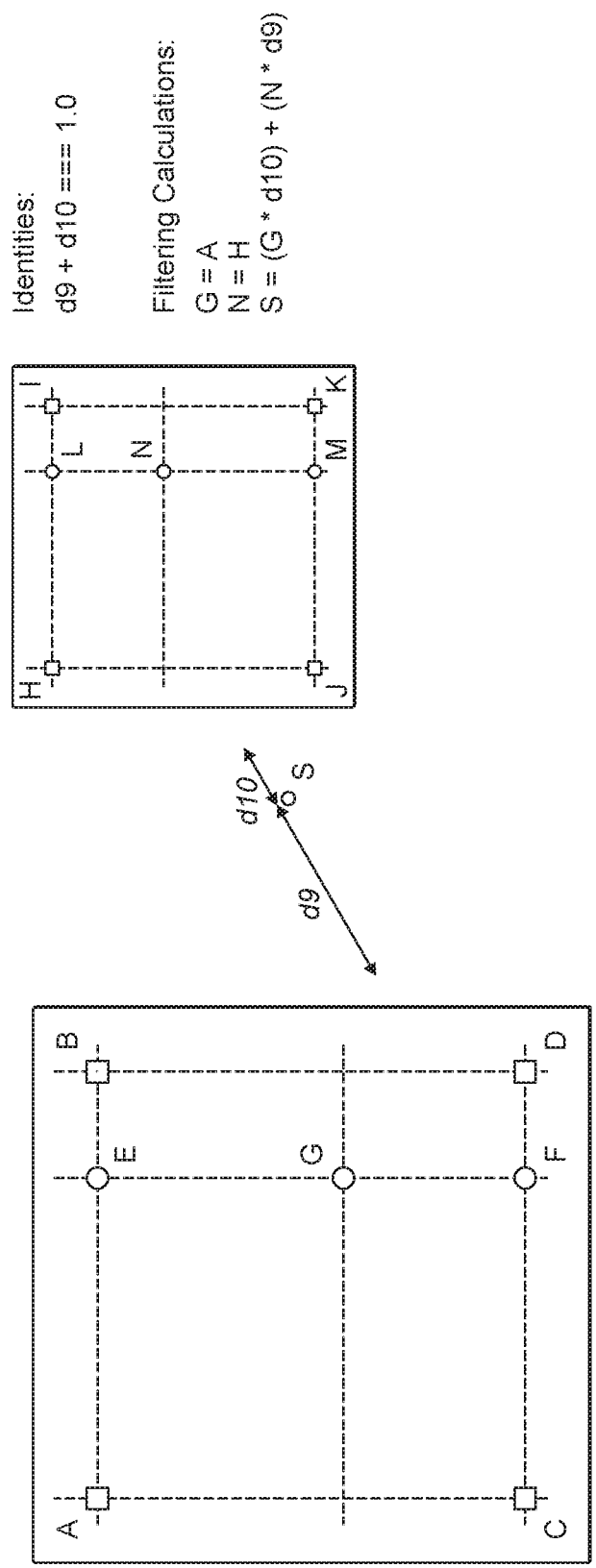

FIG. 11 shows an exemplary simplification of the trilinear filtering operation shown in FIG. 10, in the case where the two mipmaps are both a constant colour (but different colours). In this case, the only interpolation that needs to be performed is the level of detail interpolation between the two mipmap levels.

Other trilinear filtering simplifications would be possible. For example, any of the above bilinear filtering optimisations could be performed, where appropriate, within a given mipmap level of the trilinear filter. Similarly, in the case where the texels in both mipmaps are all the same, constant colour (i.e. both the mipmaps are the same colour as each other as well), then the trilinear filtering operation could be simplified to simply taking the value of one of the texels directly.

The texture filtering operation selection circuit and the texture filtering circuit could be configured to support any or all of the above exemplary simplifications. For example, the operation could be configured to either perform a conventional bilinear or trilinear filtering operation in the case where at least one of the texel values is different to the texel values, or take the value of one of the texels directly in the case where all the texel values are the same. Alternatively, the system could be configured to perform intermediate simplifications (e.g. as illustrated above) in the case where appropriate subsets of the texel values are the same (but not all the texel values are the same).

Figure 12:
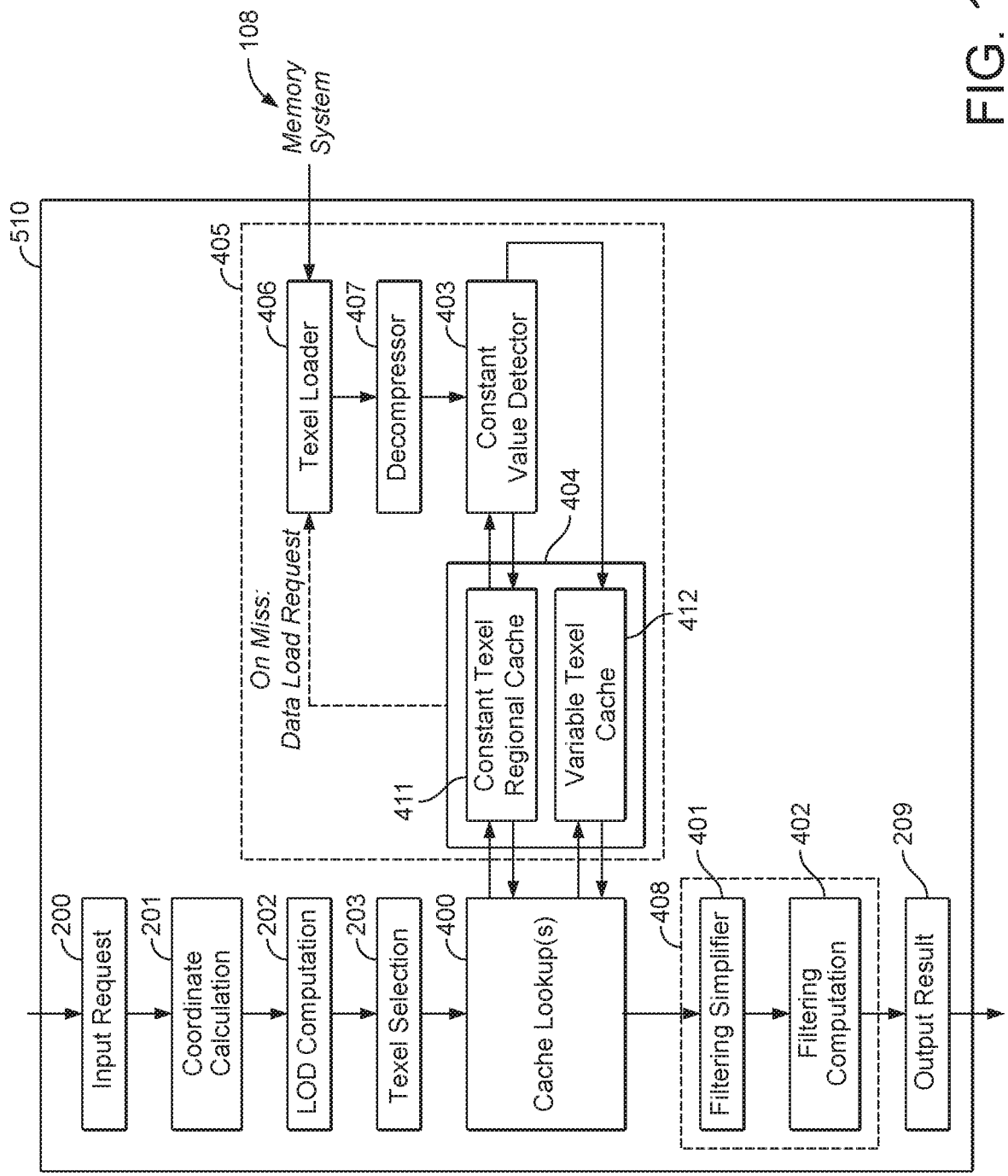
FIG. 12 shows a texture mapping apparatus according to another embodiment of the technology described herein.

FIG. 12 shows a second embodiment of a texture mapper 510 of a graphics processor 100 that is in accordance with the technology described herein.

As can be seen from FIG. 12, this texture mapper is similar to the texture mapper 410 shown in FIG. 4, but the texel cache 404 comprises two separate caches, a variable texel cache 412 and a constant texel region cache 411.

Unless otherwise stated, the remaining elements and processes of the texture mapper 510 of this embodiment are the same as or correspond to the corresponding processes and elements in the texture mapper 410 shown in FIG. 4, and so that operation will not be described again here, but can be assumed to be the same as described above with reference to FIG. 4, unless otherwise indicated.

In this embodiment, the variable texel cache 412 of the texel cache 404 of the cache system 405 of the texture mapper 510 is configured in the same way as the texel cache in the arrangement shown in FIG. 4 and illustrated in FIG. 5. Thus this cache stores per-texel texture data and is used for blocks of texels (cache lines) which may not have a constant (same) data value (colour). This variable texel cache 412 can still include, and use as discussed above in relation to FIGS. 4 and 5, a constant data value (colour) flag 508 for each cache line, if desired, or that can be omitted and it can simply be assumed that any texels fetched from the variable texel cache 412 will have different data values.

The constant texel region cache 411 stores data for regions of the texture that have been identified as all comprising the same data (colour) value. This cache accordingly stores per-area texture data (colours), rather than storing per-texel data.

Figure 13:
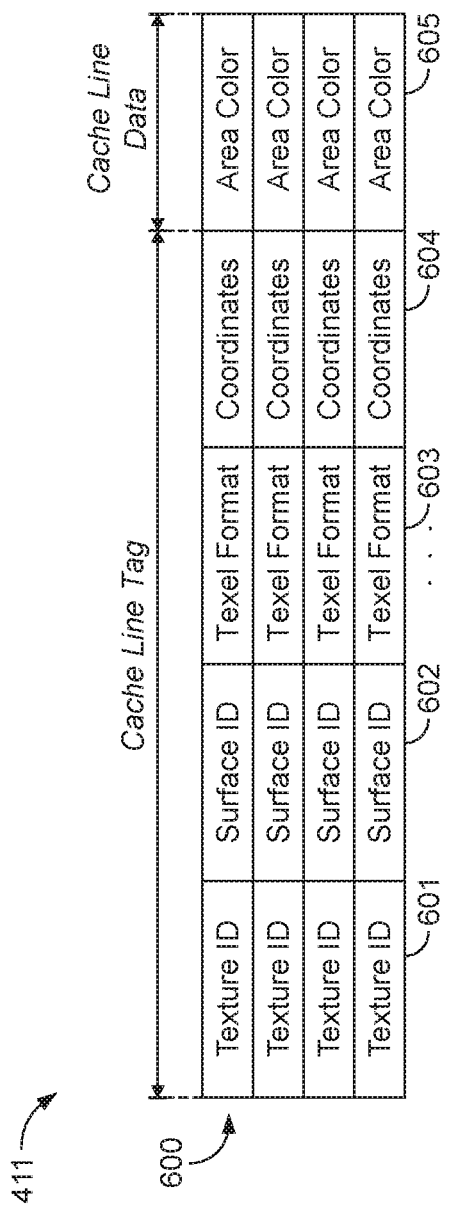
FIG. 13 shows an exemplary configuration of the constant texel region cache in the embodiment shown in FIG. 12.

FIG. 13 shows a first exemplary configuration of the constant texel region cache 411 for doing this.

As shown in FIG. 13, the constant texel region cache 411 comprises a plurality of cache lines 600, with each cache line being tagged with an appropriate texture ID 601, surface ID 602, texel format 603 and a coordinate (position) 604 indicating the region of the texture that the cache line stores texture data for. Each cache line then stores as its cache line data, a single data value (area colour) 605 that will be used for all texel lookups that "hit" in the cache line in question.

In this case, the coordinate 604 that each cache line in the constant texel region cache 411 is tagged with indicates a range of coordinates corresponding to the texture region that the cache line corresponds to. In an embodiment, the cache lines in the constant texel region cache 411 are tagged with a base coordinate, width, and a height, so as to thereby provide the ability to define arbitrary rectangular regions in the texture space which have a constant value (colour).

Figure 14:
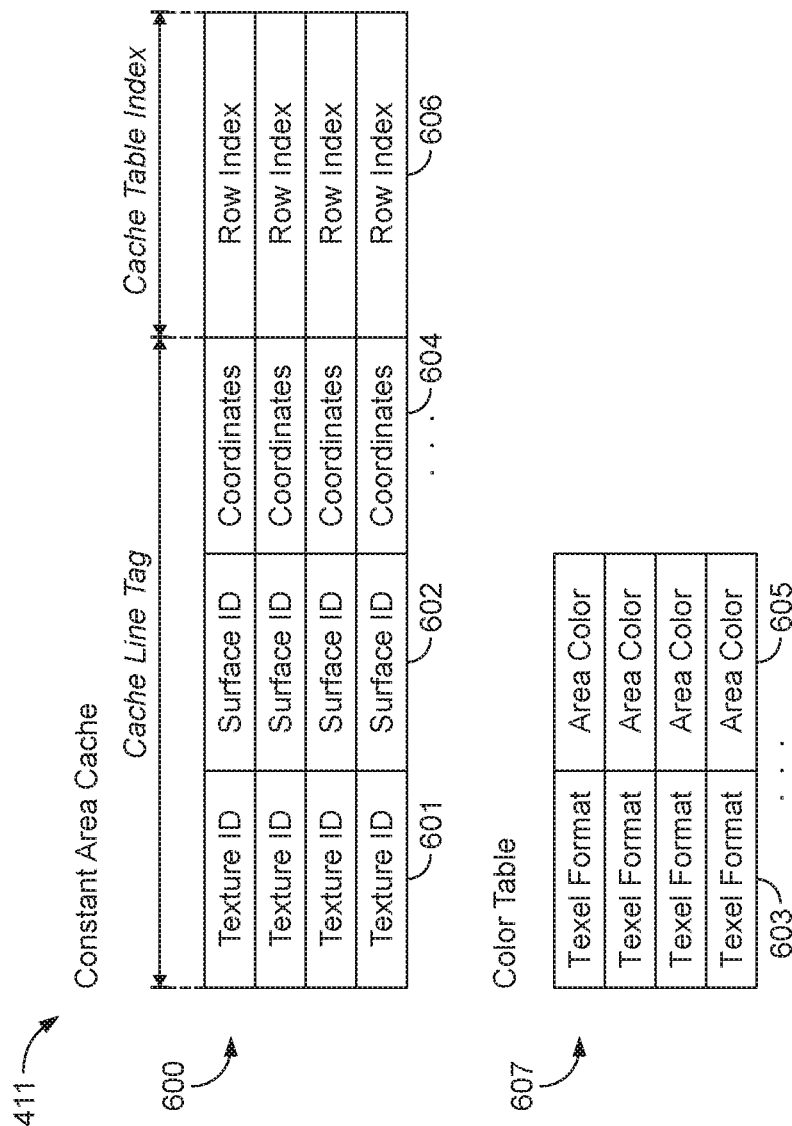
FIG. 14 shows another exemplary configuration of the constant texel region cache in the embodiment shown in FIG. 12.

FIG. 14 shows an alternative configuration for the constant texel region cache 411. In this case, as shown in FIG. 14, rather than each cache line 600 of the constant texel region cache 411 storing actual data values (colours) 605, each cache line instead stores an index 606 into a separate colour table 607, which colour table 607 stores the data values (colours) 605 (and, in this case, the texel format 603). Thus in this case, the constant texel region cache 411 stores the information for each texture and surface and identifies the regions in the textures that have a constant data value, but there is a separate data value (colour) table which stores the actual (colour) data.

The colour table 607 in this case may be stored as desired, for example in a cache of the texture mapper cache system 405, such as a further table within the overall texel cache 404.

In this case, new texel blocks could, for example, perform some form of colour-based lookup into the index table to get the matching index for any new cache lines that are created. (Writes to the constant texel region cache would translate their colours to indices, and reads from the constant texel region cache would translate the indices to colours.)

Figure 15A:
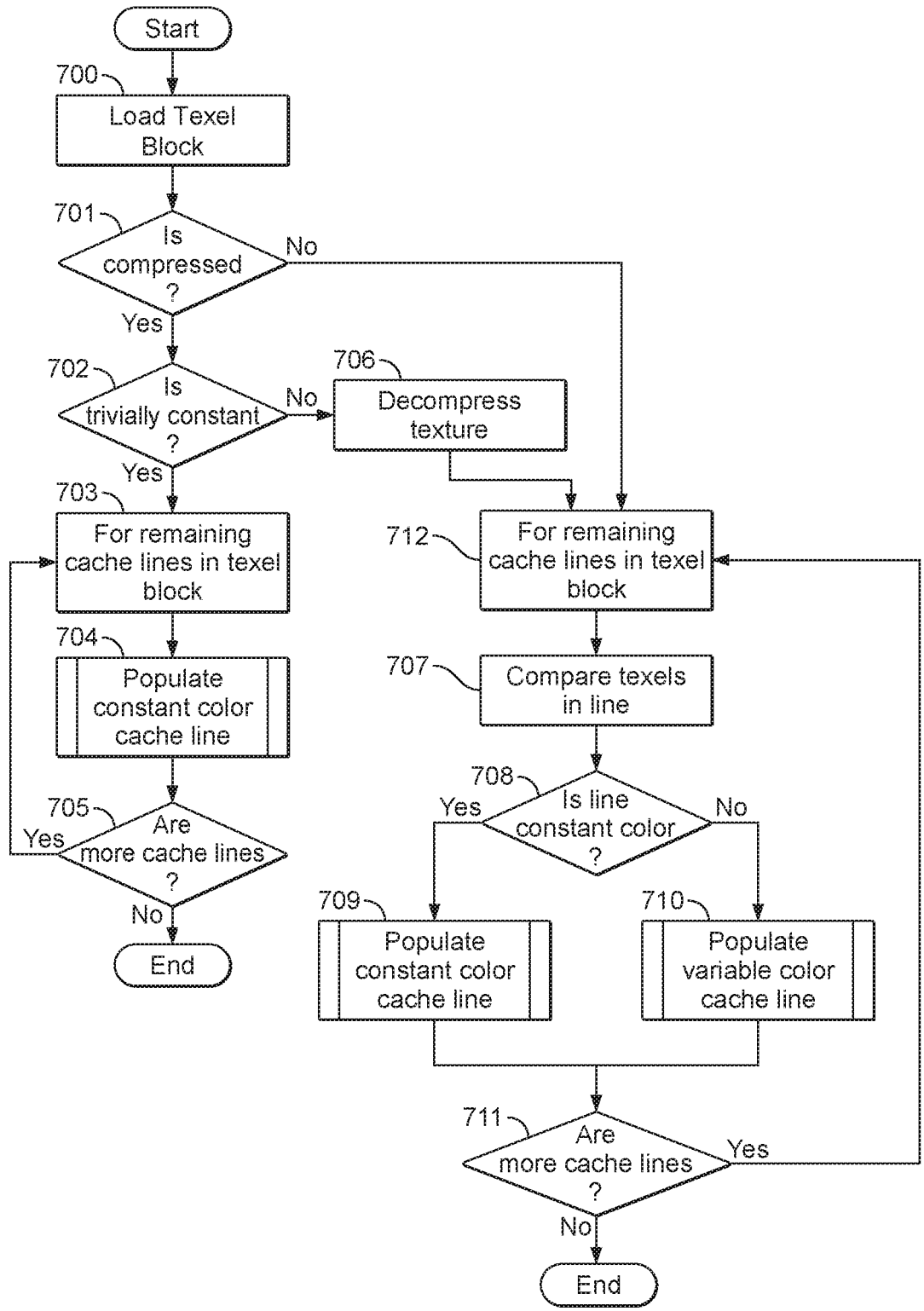
FIGS. 15A, 15B and 15C show the loading of texture data into the texture caches of the texture mapper in the embodiment shown in FIG. 4.
Figure 15B:
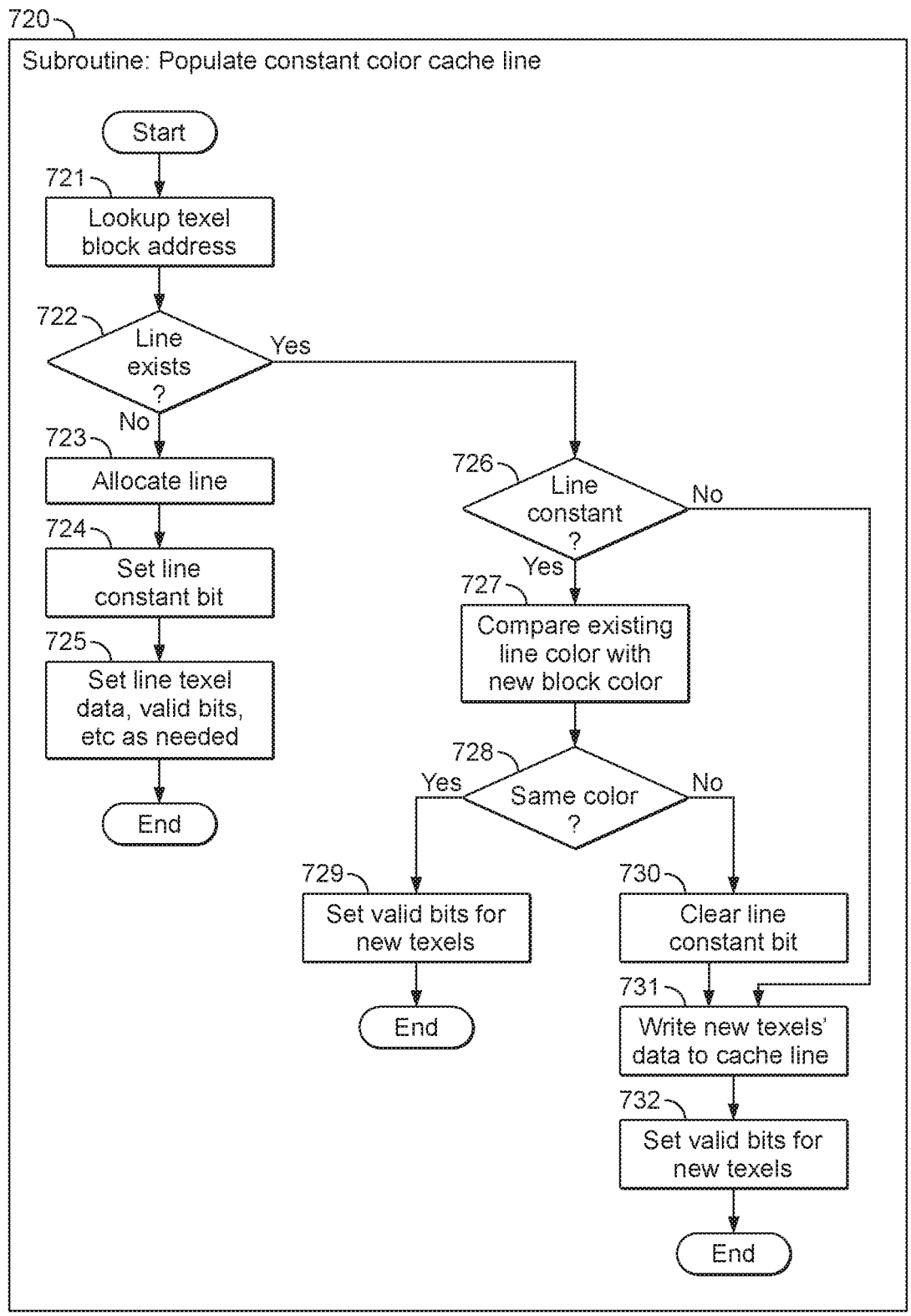
Figure 15C:
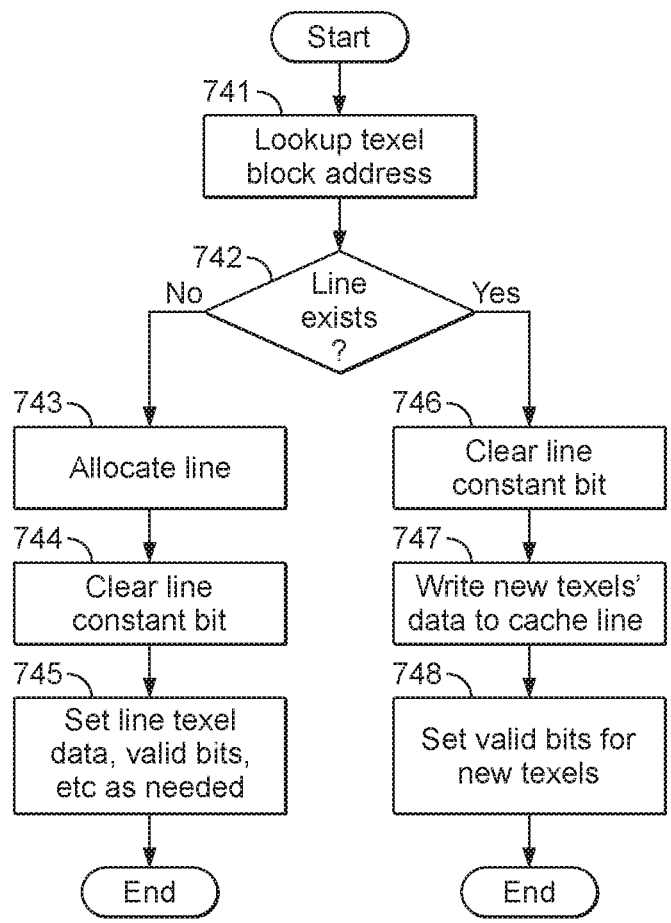

FIGS. 15A, 15B and 15C show in more detail an exemplary embodiment for the loading of texture data from the memory system 108 into a texel cache having the configuration shown in FIG. 5 (and as used, for example, in the embodiment shown in FIG. 4), i.e. that stores individual texels and has associated "constant value" metadata.

As shown in FIG. 15A, the process starts when the texel loader 406 loads a block of texels from the memory system 108 (step 700). The block of texels that is being loaded may correspond to a single cache line's worth of data, or may be more than one cache lines' worth of data, as desired.

It is then determined whether the texel data is compressed (step 701).

In the case where the texture data is compressed, if it can be determined from the compressed texture data whether the loaded block of texels all have the same data value (are from a constant colour region within the texture), then that is done (step 702). This may be done in the case, for example, where the compression scheme that has been used to store the texture data in the memory system 108 includes encoding indicators which explicitly encode constant values (colours), e.g. for defined regions or blocks of a texture. To facilitate this, the decompressor 407 could, for example, provide appropriate metadata indicating whether a block is from a constant value region to the constant region detector 403.

When it can be determined in this way that the loaded block of texels relates to a constant colour region (such that all the texels in block have the same value), then, as shown in FIG. 15A, the process operates to immediately load the texels of the block into the texel cache 404 as one or more "constant value (colour)" cache lines (steps 703, 704, 705). This operation will be discussed in more detail below.

This operation provides a "fast-path" for compressed texture loads where constant colour texel blocks can be detected without having to generate per-texel values and then compare the texel values to determine the constant colour state.

As shown in FIG. 15A, in the case where it cannot straightforwardly be determined at step 702 that the texel block relates to a constant value region within the texture, then in the case that the texture is compressed, the texels in the texture block are first decompressed (step 706).

The originally uncompressed texel block, or the decompressed texel block, as appropriate, is then processed on a cache line-by-cache line basis (in the case where the block relates to more than one cache line).

Thus, for the first cache line that the texel block relates to, the value of the texels in that cache line are compared (step 707) (by the constant region detector 403) to determine if they all have the same value (colour) or not (step 708). In the case that all the texels in the cache line have the same value (colour), then the texels are correspondingly appropriately loaded into a "constant colour" cache line of the texel cache 404 (step 709). On the other hand, where the texels for the cache line do not all have the same colour, then the texels are loaded into (used to populate) a "variable colour" cache line of the texel cache 404 (step 710).

This is then repeated for each remaining cache line that the loaded texel block corresponds to (steps 711 and 712).

This process will be repeated for each block of texels that is loaded from the memory system 108.

FIG. 15B shows in more detail the operation 720 for populating a "constant value (colour)" cache line of the texel cache with texture data. This will be done when it is determined that the texels in a block that will populate a cache line of the texel cache all have the same data value (colour) (and thus shows steps 704 and 709 in more detail).

As shown in FIG. 15B, when it is determined that texels of a texel block should be used to populate a "constant colour" cache line of the texel cache, the process starts by looking up the texel block address (in terms of the texture coordinate (position) of the texel block in the texture) (step 721).

It is then determined whether there is already a cache line in the texel cache that has been allocated to that texel block address (step 722).

When a cache line does not already exist in the texel cache for the texel block address in question, then a cache line is allocated to that texel block address (step 723), the constant value metadata (bit) for that cache line is set to indicate that all the texels that the cache line stores have the same value (step 724) and the cache line is populated with the appropriate texel data (colour), and any other texture identifying data, valid bits, etc., as needed (step 725).

On the other hand, where a cache line already exists in the texel cache for the texel block address in question, then it is determined whether that existing cache line has been marked as the texels in the cache line as having the same data value (step 726). If so, then the data value (colour) for the existing texels in the existing cache line is compared with the data value (colour) for the new texel block (step 727).

If the new texels have the same colour (data value) as the existing texels in the existing cache line for the block address in question, then the new block texels are simply added to the existing cache line, with the valid bits for the new texels being set as appropriate (steps 728 and 729). In this case, the existing cache line with the new texels added to it will be left as being indicated as storing texels all having the same data value.

On the other, if the texels for the new texel block have a different data value (colour) to the existing data value for the existing cache line, then the constant data value flag for the existing cache line is cleared (to indicate that the texels in the cache do not have the same value) (step 729). The data of the new texels is then written to the cache line and the valid bits set for those new texels (steps 731 and 732). In this case, the constant data value state of the existing cache line will accordingly be changed to show that it no longer stores texels all having the same data value.

Correspondingly, in the case where it is determined that at step 726 that the existing cache line for the texel block address in question does not store texels all having the same value, then the texels of the new block are simply written to the existing cache line and their valid bits set (steps 731 and 732), whilst leaving the constant data value flag for the cache line in its cleared (unset) state.

FIG. 15C correspondingly shows the operation 740 when it is determined that texels from a texel block have different data values and thus should be stored in a cache line that is not indicated as storing texels all having the same value.

In this case, as shown in FIG. 15C, the process again starts by looking up the texel block address (step 741) and then determining whether a cache line storing texels for that address already exists (step 742).

In the case that there is not an existing cache line for the texel block address, then a cache line is allocated (step 743), the constant data value metadata (bit) for that cache line is cleared (i.e. set to the value that indicates that the data values in the cache line differ) (step 744), and the cache line is populated with the appropriate texel data values (colours), and any other texture identifying data, valid bits, etc., as needed (step 745).

On the other hand, if a cache line for the texel block address already exists, then the constant value metadata (bit) for that cache line is cleared (set to indicate that the texels in the cache line do not all have the same value) (step 746), and the data of the new texels is then written to the existing cache line (step 747) and the valid bits for those new texels are set (step 748).

In the case where the texel cache includes both a constant texel region cache 411 (as shown in FIGS. 13 and 14) and a cache that stores individual texels (for example as in the embodiment shown in FIG. 12), then the above operation for populating the caches with texel data could be modified, for example, such that when it is determined that all the texels in a cache line have the same data value, the "block" is instead stored in the constant texel region cache 411, by allocating a cache line in the constant texel region cache 411 (if available) to that block, and setting the position in the tag for that cache line to indicate the position of the texel block in question, and setting the data value (or the index to the data value) in the cache line to the data value of the texels in the block. (Thus steps 704 and 709 of FIG. 15A would populate a cache line of the constant texel region cache 411.)

Correspondingly, when it is determined that texels in a cache line of a new texel block have different data values, then those texels would be stored in a cache line of the variable texel cache 412 in the manner shown in FIG. 15C (as operation 740 shown in FIG. 15C).

It would also be possible, if desired, to compare the data value for a new cache line to be populated in the constant texel region cache 411 with the data values for existing cache lines in the constant texel region cache 411 to see if the new cache line has the same data value as an existing cache line, and to then, if the data values are the same, rather than allocate a new cache line in the constant texel region cache to the new texel block, instead update the region that is indicated for the existing cache line in the constant texel region cache for the data value in question to also include the region covered by the new texel block. Depending upon how the coordinate (positions) that a constant texel region cache line relates to are represented in the constant texel region cache, this could be done only for texel blocks that share an aligned edge with (or overlap) the region of an existing cache line in the constant texel region cache 411, or it could also be done for non-overlapping regions, where the region position information in the constant texel region cache can convey that.

It would correspondingly be possible, if desired, for cache lines whose regions share an aligned edge (or overlap) and that have the same value (colour) to be merged into a single cache line in the constant texel region cache 411 by expanding the indicated coordinates for one of the existing cache lines to cover a larger footprint of the texture (rather than storing two separate cache lines in the constant texel region cache 411).

Figure 16:
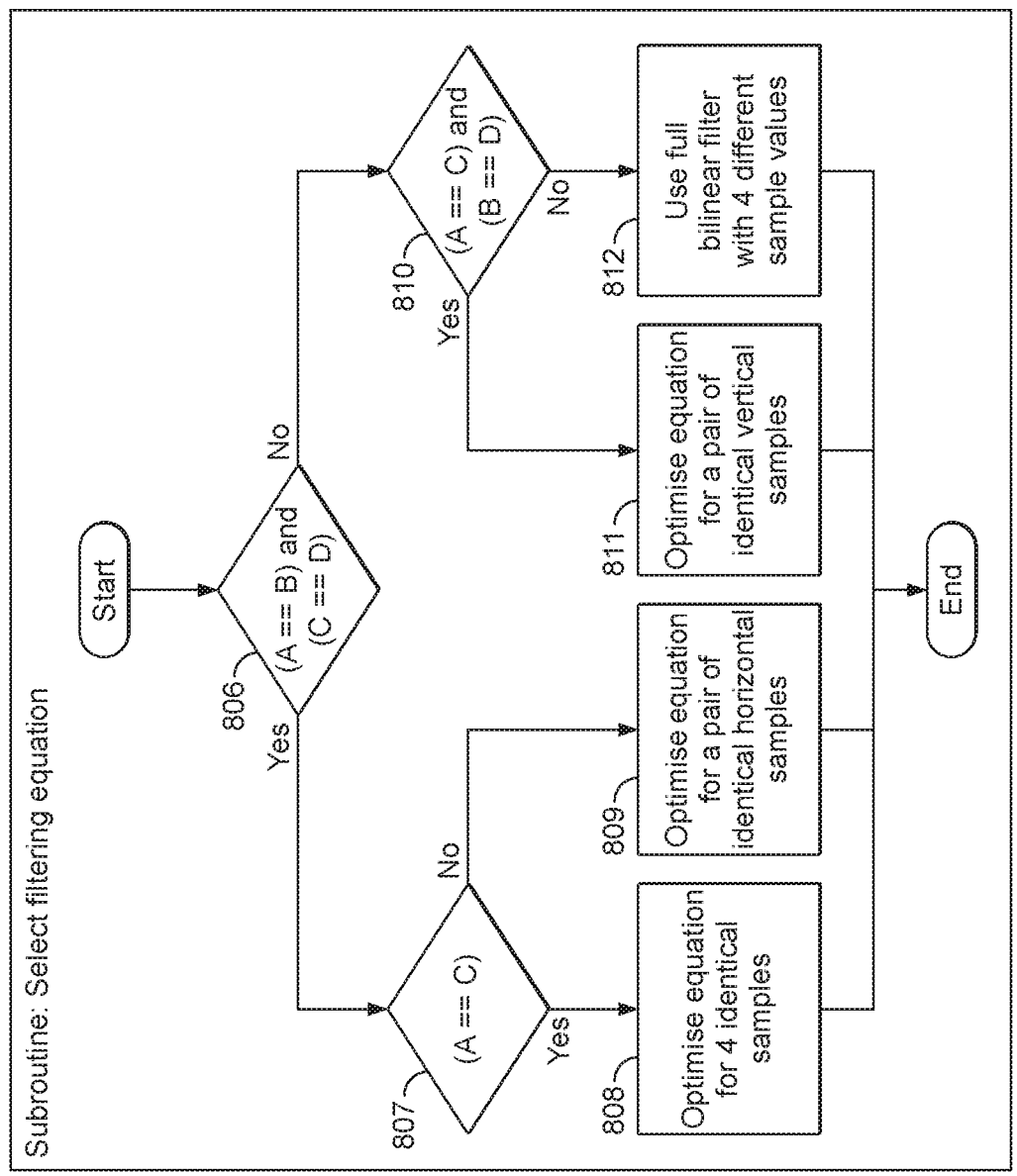
FIG. 16 shows the performing of a texture filtering operation in the embodiments shown in FIGS. 4 and 12.

FIG. 16 shows the operation of the cache lookup circuit 400 and the texturing operation circuit 408 when using texel values stored in the texture cache 404 to perform texture filtering operations. This operation will be performed in both the embodiment shown in FIG. 4 and the embodiment shown in FIG. 12.

As shown in FIG. 16, for a texture filtering operation to be performed, for all the texels to be used for the filtering operation the corresponding texel addresses (in terms of their texture coordinates (positions) in the texture) are determined (step 800) (by the texel selection circuit 203).

The cache lookup circuit 400 then looks up the required texels from the texel cache 404, using the determined texel positions as the lookup key (tag) to fetch the texels from the texel cache 404 (step 801).

In the embodiment shown in FIG. 4, the cache lookup circuit 400 will accordingly lookup the texels from the (single) texel cache 404.

On the other hand, in the embodiment shown in FIG. 12 where the texel cache 404 comprises a constant texel region cache 411 and a variable texel cache 412, the cache lookup circuit will need to attempt to lookup the required texels in both the variable texel cache 412 and the constant texel region cache 411. (The data value for any given texel should be stored in one or other of these caches, tagged with its position in the texture, as discussed above.)

This may be done as desired, e.g. as two lookups, one into each cache, either in parallel or serially.

In an embodiment, a, in an embodiment area-based, tag lookup into the constant texel region cache is done first, to see if the texel sample address (position (coordinate)) is inside a region stored in the constant texel region cache. If so (there is a hit in the constant texel region cache), the texel value is in an embodiment then returned from the constant texel region cache, but if not (there is a miss in the constant texel region cache), the lookup then falls back to (and performs) a "normal" texture lookup in the variable texel cache.

The cache lookup circuit 400 will also read any constant data value flag stored for a cache line from which it is fetching texel values.

Once the cache lookup circuit 400 has fetched the texel data values, it then provides the texture data values and a "constant state" indication (texture data value similarity information) to the texturing operation circuit 408, and in particular to the filtering simplifier circuit 401 of the texturing operation circuit 408, for use to select and then perform the texture filtering operation using the looked up texel values (step 802). This process is repeated until all the samples for the texture filtering operation in question have been looked up (steps 803 and 804).

As discussed above, the "constant state data" (texture data value similarity) information that is provided by the cache lookup circuit 400 is used to indicate whether the texels to be used for the filtering operation have the same value or not. The cache lookup circuit 400 determines and derives this information based on, e.g., any constant value bits (flags) associated with cache lines from where the texel values have been fetched, and/or whether any of the texels have been fetched from a cache line of the constant texel region cache 411 (where the texture mapper cache system includes such a cache).

The "constant state" (texture data value similarity) information that is provided to the filtering simplifier circuit 401 can take any suitable and desired form and value that can be used to indicate whether the texel values used for the filtering operation have the same value or not. For example, that constant state indication could return a single bit which can be set to one particular value (e.g. 1) if the texels for the filtering operation all have the same value (e.g. if they all came from the same cache line of a constant texel region cache 411, or all came from a cache line of a variable texel cache 412 for which a constant data value flag has been set to indicate that all the texels in that cache line have the same data value), or a different value (e.g. 0), otherwise (thereby indicating that all the texels do not have the same data value).

Additionally or alternatively, more sophisticated constant state (value similarity) information could be provided. For example, a multi-bit code could be used to allow the cache lookup circuit to indicate whether respective subsets of the texel values are the same or not (e.g. to indicate whether horizontal and/or vertical pairs of texture values are the same or not).

The filtering simplifier circuit could also be operable both to use any "constant state" (similarity) information provided by the cache lookup circuit and to compare texel values to determine whether any of the texel values for the filtering operation are the same or not, if desired.

It would also be possible to omit (to not provide) any "constant state" (similarity) indication, and simply return the texture data values (and/or indices indicative of those values) to be used for the filtering operation alone, with the filtering simplifier circuit 401 then operating to compare the data values (or indices representative of the values) to then determine whether any of the texel values for the filtering operation are the same or not.

Once it has received the texel values (colours) and any "constant state" indication from the cache lookup 400, the filtering simplifier circuit 401 then selects the texture filtering operation to be performed, based on whether any of the texel values are the same (step 805).

As shown in FIG. 16, this process starts by determining whether respective horizontal pairs of the texels are the same (step 806). (It is assumed in this example that the texture filtering operation to be performed is a bilinear filtering operation as illustrated in FIG. 6, for example. Corresponding arrangements could be used for other forms of filtering operation.)

When it is determined at step 806 that the horizontal pairs of texel values for the bilinear filtering operation are the same as each other, it is then determined whether the texel values of the two respective horizontal pairs are all the same (step 807). If so, a texture filtering operation (such as a single texel, e.g. nearest texel, sampling) that is optimised for the case where all the texel values for the filtering operation are the same is selected (step 808).

On the other hand, where the texels in respect of horizontal pairs of texels have the same value but the two horizontal pairs differ from each other, then a suitable filtering operation that is optimised for the situation where the pairs of texels in each horizontal pair have the same value as each other (but the horizontal pairs differ) is selected (step 809).

Where the pairs of texels in each respective horizontal pair of texels are determined to not be the same as each other at step 806, it's then determined whether the texels in the respective vertical pairs of texels are the same as each other (step 810). If so, a texture filtering operation that is optimised for pairs of identical vertical samples is selected as the texture filtering operation to be performed (step 811).

Otherwise, a conventional bilinear filtering operation that will use four different sample texel values is selected and performed (step 812) (as in that case all the texel values for the bilinear filtering operation have been determined to be different to each other).

As discussed above, the decision as to whether respective texel values are the same is in an embodiment done using the constant state (texel value similarity) information provided from the cache lookup circuit, but could also or instead be determined by actually comparing the texel values (or indices representing their values), if desired.

Once the texture filtering operation to be performed has been selected, the filtering computation circuit 402 is configured to perform that filtering operation accordingly. Thus, it will compute the required filtering (interpolation) weights (step 813), and compute the filtering result using the computed weights and the necessary texel values (step 814). The texture filtering operation output result will then be returned to the renderer (fragment shader) (step 815).

In the case where the texture mapper performs its texture mapping and thus filtering operations for sets of plural sampling positions together (at the same time), such as for "quads" of four (2×2) sampling positions, then it is in an embodiment also determined whether any of the different sampling positions that are being processed together (in parallel) are in fact using (all) the same texture data values, with the process then operating to perform the texture mapping operation for only one of the sampling positions (and then sharing the result to (for) all the sampling positions) that are using the same texture data values.

It can be seen from the above that the technology described herein, in its embodiments at least, can provide a more efficient mechanism for performing texture filtering operations. This is achieved, in the embodiments of the technology described herein at least, by modifying the texture filtering operation that is performed based on whether any of the texels to be used in the texture filtering operation have the same value.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics texture mapping apparatus, in which the texture mapping apparatus is operable to fetch data values for a plurality of texture data elements to be used in a texture filtering operation, and to perform a texture filtering operation using the fetched texture data element values to provide a texture filtering operation output result;

the method comprising:
when performing a texture filtering operation that uses the data values of a plurality of texture data elements to provide a texture filtering operation output result:
determining whether any of the data values of the texture data elements to be used for the texture filtering operation are the same;
selecting a texture filtering operation to be performed using data values of the texture data elements based on the determination; and
performing the selected texture filtering operation using one or more of the data values of the texture data elements to provide the texture filtering operation output result.

2. The method of claim 1, comprising selecting a first texture filtering operation in the case where all of the data values of the texture data elements to be used for the texture filtering operation are the same, and selecting a second, different, texture filtering operation in the case where none of the data values of the texture data elements to be used for the texture filtering operation are the same.

3. The method of claim 2, comprising selecting a third texture filtering operation that is different to the first and second texture filtering operations when some but not all of the data values of the texture data elements to be used for the texture filtering operation are the same.

4. The method of claim 1, wherein the texture filtering operation that is selected in the case where none of the data values of the texture data elements to be used for the texture filtering operation are the same comprises a texture filtering operation that is indicated in a texturing operation request that is received by the texture mapping apparatus.

5. The method of claim 1, wherein the texture filtering operation that is selected in the case where all of the data values of the texture data elements to be used for the texture filtering operation are the same selects a data value of one of the data values of the texture data elements to be used for the texture filtering operation as the texture filtering operation output result.

6. The method of claim 1, comprising determining whether any of the data values of the texture data elements to be used for the texture filtering operation are the same using texture data element similarity information that is indicative of whether data values of the texture data elements to be used for the texture filtering operation are the same.

7. The method of claim 6, wherein:
data values of the texture data elements to be used for the texture filtering operation are read from a cache or caches associated with the texture mapping apparatus; and
the texture data value similarity information is based on the reading of data values from the cache or caches associated with the texture mapping apparatus.

8. The method of claim 1, wherein:
data values of the texture data elements to be used for the texture filtering operation are read from a cache or caches associated with the texture mapping apparatus; and
the method comprises:
determining whether any of the data values of the texture data elements to be used for the texture filtering operation are the same based on metadata stored for texture data values in a cache of the texture mapping apparatus that is indicative of whether texture data values stored in the cache are the same or not.

9. The method of claim 1, wherein:
data values of the texture data elements to be used for the texture filtering operation are read from a cache or caches associated with the texture mapping apparatus; and
the method comprises:
determining whether any of the data values of the texture data elements to be used for the texture filtering operation are the same based on whether data values of the texture data elements to be used for the texture filtering operation have been read from a particular cache associated with the texture mapping apparatus or not.

10. A graphics texture mapping apparatus, comprising:
a texture data fetching circuit operable to fetch data values for a plurality of texture data elements to be used in a texture filtering operation;
a texture filtering circuit operable to perform a texture filtering operation using texture data element values fetched by the texture data fetching circuit to provide a texture filtering operation output result;
the texture mapping apparatus further comprising a texture filtering operation selection circuit configured to, when the texture mapping apparatus is to perform a texture filtering operation that uses the data values of a plurality of texture data elements to provide a texture filtering operation output result:
determine whether any of the data values of the texture data elements to be used for the texture filtering operation are the same;
select a texture filtering operation to be performed using data values of the texture data elements based on the determination; and
cause the texture filtering circuit to perform the selected texture filtering operation using one or more of the data values of the texture data elements to provide the texture filtering operation output result.

11. The apparatus of claim 10, wherein the texture filtering operation selection circuit is configured to:
select a first texture filtering operation in the case where all of the data values of the texture data elements to be used for the texture filtering operation are the same; and
select a second, different, texture filtering operation in the case where none of the data values of the texture data elements to be used for the texture filtering operation are the same.

12. The apparatus of claim 11, wherein:
the texture filtering operation that is selected in the case where none of the data values of the texture data elements to be used for the texture filtering operation are the same comprises a texture filtering operation that is indicated in a texturing operation request that is received by the texture mapping apparatus; and
the texture filtering operation that is selected in the case where all of the data values of the texture data elements to be used for the texture filtering operation are the same selects a data value of one of the data values of the texture data elements to be used for the texture filtering operation as the texture filtering operation output result.

13. The apparatus of claim 10, wherein the texture filtering operation selection circuit is configured to:
determine whether any of the data values of the texture data elements to be used for a texture filtering operation are the same using texture data element similarity information that is indicative of whether data values of the texture data elements to be used for the texture filtering operation are the same.

14. The apparatus of claim 10, wherein:
the texture mapping apparatus further comprises a cache system comprising at least one cache that is operable to store texture data values locally to the texture mapping apparatus; and
the texture data fetching circuit is configured to fetch data values for texture data elements to be used in a texture filtering operation from a cache or caches of the cache system.

15. The apparatus of claim 14, wherein:
the cache system of the texture mapping apparatus includes a cache configured such that each cache line in the cache can store a plurality of texture data values as separate, discrete entries in the cache line; and each cache line of the cache has associated constant value metadata that can be set to indicate that all the texture data values stored in the cache line have the same data value; and the texture filtering operation selection circuit is configured to:

when data values of texture data elements to be used for a texture filtering operation are being fetched from a cache line of the cache, use the associated constant value metadata for the cache line to determine whether any of the data values of the texture data elements to be used for a texture filtering operation are the same.

16. The apparatus of claim 14, wherein:

the cache system of the texture mapping apparatus includes a cache configured such that each cache line in the cache can store an indication of a texture data value that the cache line is associated with, together with an indication of a region of a texture to which that data value applies; and the texture filtering operation selection circuit is configured to:

determine whether any of the data values of texture data elements to be used for a texture filtering operation are the same based on whether data values of texture data elements to be used for the texture filtering operation have been read from that cache of the texture mapping apparatus.

17. The apparatus of claim 14, wherein:

the cache system of the texture mapping apparatus comprises a texture data element value evaluation circuit that is operable to:

determine whether the data values of texture data elements fetched from the memory system for loading into a cache or caches of the cache system are the same as each other;

and to, based on the determination, perform one or more of:

selecting a particular cache of the cache system to store data values for the texture data elements in; and setting constant data value metadata associated with a cache line in a cache of the cache system.

18. The apparatus of claim 17, wherein the texture data element value evaluation circuit is operable to use encoding information associated with a texture stored in the memory system that is indicative of constant data value regions in the texture, to identify texture data elements having the same data value that are being fetched from a texture stored in the memory system.

19. A graphics processor comprising a graphics texture mapping apparatus that comprises:

a texture data fetching circuit operable to fetch data values for a plurality of texture data elements to be used in a texture filtering operation;

a texture filtering circuit operable to perform a texture filtering operation using texture data element values fetched by the texture data fetching circuit to provide a texture filtering operation output result; and a texture filtering operation selection circuit configured to, when the texture mapping apparatus is to perform a texture filtering operation that uses the data values of a plurality of texture data elements to provide a texture filtering operation output result:

determine whether any of the data values of the texture data elements to be used for the texture filtering operation are the same;

select a texture filtering operation to be performed using data values of the texture data elements based on the determination; and cause the texture filtering circuit to perform the selected texture filtering operation using one or more of the data values of the texture data elements to provide the texture filtering operation output result.

20. A non-transitory computer readable storage medium storing computer software code which when executing on a processor performs a method of operating a graphics texture mapping apparatus, in which the texture mapping apparatus is operable to fetch data values for a plurality of texture data elements to be used in a texture filtering operation, and to perform a texture filtering operation using the fetched texture data element values to provide a texture filtering operation output result;

the method comprising:

when performing a texture filtering operation that uses the data values of a plurality of texture data elements to provide a texture filtering operation output result:

determining whether any of the data values of the texture data elements to be used for the texture filtering operation are the same;

selecting a texture filtering operation to be performed using data values of the texture data elements based on the determination; and performing the selected texture filtering operation using one or more of the data values of the texture data elements to provide the texture filtering operation output result.

* * * * *